US012562435B2

(12) United States Patent
Kim et al.

(10) Patent No.: US 12,562,435 B2
(45) Date of Patent: Feb. 24, 2026

(54) SEPARATOR FOR LITHIUM SECONDARY BATTERY, AND LITHIUM SECONDARY BATTERY COMPRISING SAME

(71) Applicant: Samsung SDI Co., Ltd., Yongin-si (KR)

(72) Inventors: Yongkyoung Kim, Yongin-si (KR); Gain Kim, Yongin-si (KR); Jungyoon Lee, Yongin-si (KR); Yeonjoo Choi, Yongin-si (KR); Yangseob Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 907 days.

(21) Appl. No.: 17/416,686

(22) PCT Filed: Aug. 9, 2019

(86) PCT No.: PCT/KR2019/010131
§ 371 (c)(1),
(2) Date: Dec. 15, 2021

(87) PCT Pub. No.: WO2020/141684
PCT Pub. Date: Jul. 9, 2020

(65) Prior Publication Data

US 2022/0102810 A1 Mar. 31, 2022

(30) Foreign Application Priority Data

Jan. 4, 2019 (KR) ........................ 10-2019-0001400

(51) Int. Cl.
*H01M 50/446* (2021.01)
*C08F 220/56* (2006.01)
(Continued)

(52) U.S. Cl.
CPC ......... *H01M 50/446* (2021.01); *C08F 220/56* (2013.01); *C08L 33/12* (2013.01);
(Continued)

(58) Field of Classification Search
CPC ............. H01M 50/446; H01M 50/443; H01M 50/449; H01M 10/0525; C08F 220/56; C08L 33/12; C09D 133/12; C09D 133/26
See application file for complete search history.

(56) References Cited

U.S. PATENT DOCUMENTS

2006/0263693 A1 11/2006 Kim et al.
2010/0112454 A1 5/2010 Visco
(Continued)

FOREIGN PATENT DOCUMENTS

CA 2881701 A1 3/2014
CN 1855584 A 11/2006
(Continued)

OTHER PUBLICATIONS

Chinese Office Action for CN Appl. 201980084182.6 dated May 31, 2023, 19 pgs.
(Continued)

*Primary Examiner* — Nicole M. Buie-Hatcher
*Assistant Examiner* — Taylor Harrison Krone
(74) *Attorney, Agent, or Firm* — Womble Bond Dickinson (US) LLP

(57) ABSTRACT

The present invention relates to a separator for a lithium secondary battery, and a lithium secondary battery including the same, the separator including a porous substrate and a coating layer located on at least one surface of the porous substrate, wherein the coating layer includes a heat-resistant binder including a (meth)acrylic copolymer including a first structural unit derived from (meth)acrylamide, a second structural unit derived from (meth)acrylonitrile, and a third
(Continued)

structural unit derived from (meth)acrylaminosulfonic acid, a (meth)acrylaminosulfonate or a combination thereof; an adhesive binder having a core-shell structure; and inorganic particles, wherein the adhesive binder has an average particle diameter of 0.2 μm to 1.0 μm, and the inorganic particles have an average particle diameter of 0.2 μm to 1.0 μm.

20 Claims, 10 Drawing Sheets

(51) Int. Cl.

| | |
|---|---|
| ***C08L 33/12*** | (2006.01) |
| ***C09D 133/12*** | (2006.01) |
| ***C09D 133/26*** | (2006.01) |
| ***H01M 10/0525*** | (2010.01) |
| ***H01M 50/443*** | (2021.01) |
| ***H01M 50/449*** | (2021.01) |

(52) U.S. Cl.

CPC ......... *C09D 133/12* (2013.01); *C09D 133/26* (2013.01); *H01M 10/0525* (2013.01); *H01M 50/443* (2021.01); *H01M 50/449* (2021.01)

(56) References Cited

U.S. PATENT DOCUMENTS

| | | | | |
|---|---|---|---|---|
| 2010/0233409 | A1 | 9/2010 | Kamiya et al. | |
| 2011/0318630 | A1 | 12/2011 | Wakizaka et al. | |
| 2012/0115036 | A1 | 5/2012 | Lee et al. | |
| 2013/0017429 | A1 | 1/2013 | Ha et al. | |
| 2013/0252066 | A1 | 9/2013 | Yeou et al. | |
| 2013/0302661 | A1 | 11/2013 | Kim et al. | |
| 2013/0323569 | A1 | 12/2013 | Yeou et al. | |
| 2013/0330590 | A1 | 12/2013 | Toyoda | |
| 2014/0050965 | A1 | 2/2014 | Ha et al. | |
| 2014/0120402 | A1 | 5/2014 | Yu et al. | |
| 2014/0147726 | A1 | 5/2014 | Toyoda | |
| 2014/0186680 | A1 | 7/2014 | Kim et al. | |
| 2014/0272532 | A1* | 9/2014 | Park .................... | H01M 50/461 429/144 |
| 2014/0342226 | A1 | 11/2014 | Sasaki | |
| 2015/0010815 | A1 | 1/2015 | Chung et al. | |
| 2015/0030933 | A1 | 1/2015 | Goetzen et al. | |
| 2015/0111086 | A1 | 4/2015 | Arnold et al. | |
| 2015/0333308 | A1* | 11/2015 | Toyoda ............. | H01M 10/0525 429/144 |
| 2016/0013465 | A1 | 1/2016 | Akiike | |
| 2016/0141581 | A1* | 5/2016 | Sasaki ............... | H01M 10/0525 429/144 |
| 2016/0149184 | A1 | 5/2016 | Nam et al. | |
| 2016/0149190 | A1 | 5/2016 | Fukuchi | |
| 2016/0181618 | A1 | 6/2016 | Hoshiba | |
| 2016/0344007 | A1 | 11/2016 | Toyoda et al. | |
| 2017/0162848 | A1 | 6/2017 | Pan et al. | |
| 2017/0200932 | A1* | 7/2017 | Sasaki ................. | H01M 50/443 |
| 2017/0326863 | A1 | 11/2017 | Wang et al. | |
| 2017/0338461 | A1* | 11/2017 | Seo ....................... | H01M 50/42 |
| 2018/0053963 | A1 | 2/2018 | Tanaka | |
| 2018/0114966 | A1 | 4/2018 | Yasuda et al. | |
| 2018/0337381 | A1 | 11/2018 | Seo et al. | |
| 2018/0351149 | A1 | 12/2018 | Akiike et al. | |
| 2018/0358649 | A1 | 12/2018 | Inoue et al. | |
| 2019/0013504 | A1 | 1/2019 | Choi et al. | |
| 2019/0106521 | A1 | 4/2019 | Takamatsu | |
| 2019/0245183 | A1 | 8/2019 | Jeong et al. | |
| 2019/0288293 | A1 | 9/2019 | Arihara | |
| 2020/0388808 | A1 | 12/2020 | Choi et al. | |
| 2021/0226299 | A1 | 7/2021 | Choi et al. | |
| 2021/0234235 | A1 | 7/2021 | Kang et al. | |
| 2022/0013859 | A1 | 1/2022 | Kim et al. | |
| 2022/0029244 | A1 | 1/2022 | Kim et al. | |
| 2022/0037739 | A1 | 2/2022 | Lee et al. | |
| 2022/0037741 | A1 | 2/2022 | Lee et al. | |
| 2022/0102810 | A1 | 3/2022 | Kim et al. | |

FOREIGN PATENT DOCUMENTS

| | | | | |
|---|---|---|---|---|
| CN | 102770984 | A | 11/2012 | |
| CN | 102893427 | A | 1/2013 | |
| CN | 103390740 | A | 11/2013 | |
| CN | 103620820 | A | 3/2014 | |
| CN | 103718336 | A | 4/2014 | |
| CN | 103857732 | A | 6/2014 | |
| CN | 104277746 | A | 1/2015 | |
| CN | 104521031 | A | 4/2015 | |
| CN | 105324868 | A | 2/2016 | |
| CN | 105378989 | A | 3/2016 | |
| CN | 105440770 | A | 3/2016 | |
| CN | 105531854 | A | 4/2016 | |
| CN | 106328865 | A | 1/2017 | |
| CN | 107394087 | A | 11/2017 | |
| CN | 107851765 | A | 3/2018 | |
| CN | 108305970 | A | 7/2018 | |
| CN | 108463904 | A | 8/2018 | |
| CN | 108666499 | A | 10/2018 | |
| CN | 108963148 | A | 12/2018 | |
| CN | 109037564 | A | 12/2018 | |
| CN | 109075291 | A | 12/2018 | |
| CN | 113228397 | A | 8/2021 | |
| EP | 2116372 | A1 | 11/2009 | |
| EP | 2549564 | A2 | 1/2013 | |
| EP | 2779277 | A1 | 9/2014 | |
| EP | 3246969 | A1 | 11/2017 | |
| EP | 3588636 | A1 | 1/2020 | |
| EP | 3748730 | A1 | 12/2020 | |
| EP | 3855529 | A1 | 7/2021 | |
| EP | 3902027 | A1 | 10/2021 | |
| EP | 3902028 | A1 | 10/2021 | |
| EP | 3905381 | A | 11/2021 | |
| EP | 3907781 | A1 | 11/2021 | |
| JP | 03-175023 | A | 7/1991 | |
| JP | 2011-832 | A | 1/2011 | |
| JP | 2011-5670 | A | 1/2011 | |
| JP | 2014-149935 | A | 8/2014 | |
| JP | 2014-225410 | A | 12/2014 | |
| JP | 2014-229406 | A | 12/2014 | |
| JP | 2015-88253 | A | 5/2015 | |
| JP | 2015-088253 | A | 5/2015 | |
| JP | 2015-185530 | A | 10/2015 | |
| JP | 2016-105398 | A | 6/2016 | |
| JP | 2017-050149 | A | 3/2017 | |
| JP | 2017-103206 | A | 6/2017 | |
| JP | 2018-26266 | A | 2/2018 | |
| JP | 2018-34496 | A | 3/2018 | |
| JP | 2018-092701 | A | 6/2018 | |
| JP | 2019-57486 | A | 4/2019 | |
| JP | 2020-87591 | A | 6/2020 | |
| KR | 10-2011-0097715 | A | 8/2011 | |
| KR | 10-2011-0104791 | A | 9/2011 | |
| KR | 10-2012-0093772 | A | 8/2012 | |
| KR | 10-2012-0097238 | A | 9/2012 | |
| KR | 10-1254693 | B1 | 4/2013 | |
| KR | 10-2014-0044757 | A | 4/2014 | |
| KR | 10-2014-0116415 | A | 10/2014 | |
| KR | 10-2014-0147742 | A | 12/2014 | |
| KR | 10-2015-0034825 | A | 4/2015 | |
| KR | 10-2016-0033692 | A | 3/2016 | |
| KR | 20160033692 | A * | 3/2016 | ............. C08L 33/26 |
| KR | 10-2016-0061165 | A | 5/2016 | |
| KR | 10-2016-0109669 | A | 9/2016 | |
| KR | 10-2016-0118979 | A | 10/2016 | |
| KR | 10-2017-0003020 | A | 1/2017 | |
| KR | 10-2017-0015149 | A | 2/2017 | |
| KR | 10-2017-0045438 | A | 4/2017 | |
| KR | 10-2017-0084597 | A | 7/2017 | |
| KR | 10-2017-0095024 | A | 8/2017 | |
| KR | 10-2017-0129645 | A | 11/2017 | |
| KR | 10-2018-0003177 | A | 1/2018 | |
| KR | 10-1868240 | B1 | 6/2018 | |
| KR | 10-2018-0109740 | A | 10/2018 | |

(56) References Cited

FOREIGN PATENT DOCUMENTS

| | | | |
|---|---|---|---|
| WO | WO 2009/060787 | A1 | 5/2009 |
| WO | WO 2010/074205 | A1 | 7/2010 |
| WO | WO 2013/080938 | A1 | 6/2013 |
| WO | WO 2014/054919 | A1 | 4/2014 |
| WO | WO 2014/136799 | A1 | 9/2014 |
| WO | WO 2015/008626 | A1 | 1/2015 |
| WO | WO 2015/046191 | A1 | 4/2015 |
| WO | WO 2015/076571 | A1 | 5/2015 |
| WO | WO 2015/122322 | A1 | 8/2015 |
| WO | WO 2018/147714 | A1 | 8/2018 |
| WO | WO 2018/155345 | A1 | 8/2018 |

OTHER PUBLICATIONS

"Derive." New Oxford American Dictionary. Eds. Stevenson, Angus, and Christine A. Lindberg. : Oxford University Press, 2011. Oxford Reference. Date Accessed Aug. 10, 2023, https://www.oxfordreference.com/view/10.1093/acref/9780195392883.001.0001/m_en_us1 239627. (Year: 2011).
Chinese Decision of Rejection, with English translation, dated Jul. 1, 2023, issued in Chinese Patent Application No. 201980085911.X (21 pages).
Chinese Notice of Allowance, with English translation, dated Jan. 13, 2023, issued in Chinese Patent Application No. 201980055198.4 (8 pages).
Chinese Office Action, with English translation, dated Apr. 13, 2023, issued in corresponding Chinese Patent Application No. 201980083245.6 (6 pages).
Chinese Office Action, with English translation, dated Apr. 23, 2023, issued in Chinese Patent Application No. 201980085835.2 (15 pages).
Chinese Office Action, with English translation, dated Aug. 12, 2023, issued in Chinese Patent Application No. 201980082244.X (13 pages).
Chinese Office Action, with English translation, dated Aug. 3, 2022, issued in Chinese Patent Application No. 201980055198.4 (20 pages).
Chinese Office Action, with English translation, dated Jun. 22, 2023, issued in Chinese Patent Application No. 201980087908.1 (23 pages).
Chinese Office Action, with English translation, dated Oct. 24, 2022, issued in Chinese Patent Application No. 201980087908.1 (18 pages).
Chinese Office Action, with English translation, dated Sep. 20, 2022, issued in corresponding Chinese Patent Application No. 201980083245.6 (28 pages).
Chinese Office Action, with English translation, dated Sep. 30, 2022, issued in Chinese Patent Application No. 201980085835.2 (15 pages).
EPO Extended European Search Report dated Aug. 3, 2022, issued in corresponding European Patent Application No. 19898125.0 (11 pages).
EPO Extended European Search Report dated Dec. 6, 2022, issued in European Patent Application No. 19910153.6 (9 pages).
EPO Extended European Search Report dated May 17, 2022, issued in European Patent Application No. 19861770.6 (10 pages).
EPO Extended European Search Report dated Oct. 14, 2022, issued in European Patent Application No. 19904249.0 (9 pages).
EPO Third Party Observations dated Sep. 21, 2021, issued in European Patent Application No. 19861770.6 (20 pages).
Ghosh, Prof. Premamoy, "Polymer Science Fundamentals of Polymer Science: Molecular Weights of Polymers," Sep. 2006, XP055608363, 22 pages.
International Search Report for Application No. PCT/KR2019/008767 dated Oct. 25, 2019, 4pp.
International Search Report for Application No. PCT/KR2019/009085 dated Oct. 30, 2019, 4pp.
International Search Report for Application No. PCT/KR2019/010130 dated Nov. 26, 2019, 4pp.
International Search Report for corresponding Application No. PCT/KR2019/010128 dated Nov. 26, 2019, 6pp.
Japanese Office Action dated Jun. 20, 2022, issued in Japanese Patent Application No. 2021-513921 (6 pages).
Notification of Third Party Observation dated Jun. 6, 2022, 15 pages.
US Final Office Action dated Aug. 18, 2023, issued in U.S. Appl. No. 17/414,043 (19 pages).
US Final Office Action dated Sep. 25, 2023, issued in U.S. Appl. No. 17/296,501 (26 pages).
US Office Action dated Jun. 14, 2023, issued in U.S. Appl. No. 17/296,501 (29 pages).
US Office Action dated May 2, 2023, issued in U.S. Appl. No. 17/414,043, 19 pages.
JP 2020087591—Translation, 20 pages.
WO 2015046191—Translation, 17 pages.
US Notice of Allowance dated Jan. 24, 2024, issued in U.S. Appl. No. 17/296,528 (11 pages).
US Office Action dated Feb. 7, 2024, issued in U.S. Appl. No. 17/294,343 (20 pages).
Partial CA 2881701 A1 provided with US Office Action dated Feb. 7, 2024, issued in U.S. Appl. No. 17/294,343.
US Final Office Action dated Mar. 6, 2024, issued in U.S. Appl. No. 17/297,373 (9 pages).
Chang, Song, et al., "A review of functional separator for improving the flammability of lithium-sulfur batteries," The Chinese Journal of Process Engineering, vol. 18 S1, Nov. 2018, 10 pages.
Li, Xia, et al., "Derivatives of Acrylamide and Their Application," Fine and Specialty Chemicals, vol. 13, No. 24, Dec. 2005, 5 pages.
Liu, Meihua, et al., "Enhancement on the thermostability and wettability of lithium-ion batteries separator via surface chemical modification," Materials Letters, vol. 208, 2017, pp. 98-101.
Chinese Notice of Allowance, with English translation, dated Aug. 30, 2023, issued in Chinese Patent Application No. 201980084182.6 (8 pages).
Technical Data Sheet of Boeh mite 200SM by Nalbatec AG, retrieved from https://nabaltec.de/en/products/boehmite/ (Year: 2023).
Technical Data Sheet of Boeh mite AOH 60 by Nalbatec AG, retrieved from https://nabaltec.de/en/products/boehmite/ (Year: 2023).
US Office Action dated Dec. 1, 2023, issued in U.S. Appl. No. 17/297,373 (pages).
EPO Extended European Search Report dated Dec. 20, 2022, issued in European Patent Application No. 19902175.9 (8 pages).
US Office Action dated Mar. 28, 2024, issued in U.S. Appl. No. 17/296,528 (7 pages).
Limparyoon, Nattawut, et al., "Acrylamide/2-acrylamido-2-methylpropane sulfonic acid and associated sodium salt superabsorbent copolymer nanocomposites with mica as fire retardants", Polymer Degradation and Stability, vol. 96, No. 6, pp. 1054-1063, 2011.
International Search Report for corresponding Application No. PCT/KR2019/010131 dated Nov. 28, 2019, 4pp.
Chinese Office Action for CN Application No. 201980082244.X dated Sep. 26, 2022, 14 pages.
Chinese Office Action for CN Application No. 201980084182.6 dated Sep. 29, 2022, 16 pages.
Chinese Office Action for CN Application No. 201980085911.X dated Oct. 8, 2022, 21 pages.
Chinese Office Action for CN Application No. 201980087928.9 dated Oct. 9, 2022, 21 pages.
European Search Report for EP 19906911.3 dated Oct. 14, 2022, 7 pages.
Fedelich, "Application Handbook Thermal Analysis of Polymers Selected Applications Thermal Analysis", Jan. 1, 2013, XP055608279, Retrieved from the Internet: URL: https://www.mt.com/dam/LabDiv/guides-glen/ta-polymer/TA_Polymers_Selected_Apps_EN.pdf [retrieved on Jul. 24, 2019], 40 pgs.
Ghosh, "Polymer Science Fundamentals of Polymer Science Molecular Weights of Polymers Contents Introduction Concept of Average Molecular Weight Number Average Molecular Weight Membrane Osmometry Weight Average Molecular Weight Assessment of Shape of Polymer Molecules Viscosity Average Molecular Weight Gener", Sep. 21, 2006, XP055608363, 22 pgs.

(56) References Cited

OTHER PUBLICATIONS

International Search Report for Application No. PCT/KR2019/009136 dated Oct. 30, 2019, 4 pp.
International Search Report for Application No. PCT/KR2019/009945 dated Nov. 20, 2019, 4 pp.
International Search Report for Application No. PCT/KR2019/010129 dated Nov. 28, 2019, 4 pp.
European Search Report for EP 19898811.5 dated Aug. 3, 2022, 11 pages.
European Search Report for EP 19902841.6 dated Aug. 12, 2022, 12 pages.
US Final Office Action dated May 22, 2024, issued in U.S. Appl. No. 17/294,343 (22 pages).
Chinese Office Action, with English translation, dated Mar. 8, 2023, issued in Chinese Patent Application No. 201980085911.X (20 pages).
Chinese Office Action, with English translation, dated Apr. 3, 2023, issued in corresponding Chinese Patent Application No. 201980087928.9 (28 pages).
Chinese Office Action, with English translation, dated Apr. 20, 2023, issued in Chinese Patent Application No. CN 201980082244.X (13 pages).
US Office Action dated Sep. 10, 2024, issued in U.S. Appl. No. 17/294,343 (18 pages).
US Final Office Action dated Oct. 24, 2024, issued in U.S. Appl. No. 17/296,528 (10 pages).
EPO Office Action dated Nov. 28, 2024, issued in European Patent Application No. 19898811.5 (4 pages).
Office Action for U.S. Appl. No. 18/753,917 dated Jan. 29, 2025, 15 pages.
US Final Office Action dated Aug. 1, 2025, issued in U.S. Appl. No. 18/753,917 (16 pages).
European Office Action corresponding to EP Application No. 19906911.3, dated Jun. 11, 2025, 6 pages.
US Office Action dated Dec. 2, 2025, issued in U.S. Appl. No. 18/753,917 (17 pages).

* cited by examiner

Comparative Example 1 Example 1

SEPARATOR FOR LITHIUM SECONDARY BATTERY, AND LITHIUM SECONDARY BATTERY COMPRISING SAME

CROSS-REFERENCE TO RELATED APPLICATIONS

This application is a U.S. National Phase Patent Application of International Application Number PCT/KR2019/010131, filed on Aug. 9, 2019, which claims priority to Korean Patent Application Number 10-2019-0001400, filed on Jan. 4, 2019, the entire content of both of which is incorporated herein by reference.

TECHNICAL FIELD

A separator for a lithium secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability of a battery is required.

In this regard, a method of increasing heat resistance of the separator by mixing inorganic particles having large heat resistance with an organic binder having adherence and coating them on the separator has been known. However, this conventional method may not sufficiently securing desired adhesive strength and in addition, is difficult to universally apply to separators having various sizes and shapes.

DISCLOSURE

Technical Problem

A separator for a lithium secondary battery having high heat resistance and strong adhesive strength, and a lithium secondary battery having improved cycle-life characteristics by including the same are provided.

Technical Solution

In an embodiment, a separator for a lithium secondary battery includes a porous substrate, and a coating layer on at least one surface of the porous substrate, wherein the coating layer includes a heat-resistant binder including a (meth)acrylic copolymer including a first structural unit derived from (meth)acrylamide, a second structural unit derived from (meth)acrylonitrile, and a third structural unit derived from (meth)acrylamidosulfonic acid, a (meth)acrylamidosulfonate salt, or a combination thereof; an adhesive binder having a core-shell structure; and inorganic particles; wherein the adhesive binder has an average particle diameter of 0.2 μm to 1.0 μm, and the inorganic particles have an average particle diameter of 0.2 μm to 1.0 μm.

The adhesive binder may be a (meth)acrylic polymer including a structural unit derived from (meth)acrylic acid or (meth)acrylate and a structural unit derived from a monomer having a polymerizable unsaturated group.

The monomer having the polymerizable unsaturated group may be at least one selected from a styrene-based monomer, an acid-derived monomer, and a combination thereof.

The acid-derived monomer may be at least one selected from itaconic acid, acrylic acid, and a combination thereof.

The adhesive binder may be included in an amount of 1 to 20 wt % based on the total amount of the coating layer.

A weight ratio of the heat-resistant binder including the (meth)acrylic copolymer: the inorganic particles may be 1:20 to 1:40.

The coating layer may include a heat-resistant layer on the porous substrate and an adhesive layer on the heat-resistant layer, wherein the heat-resistant binder may be included in the heat-resistant layer, and the adhesive binder may be included in the adhesive layer.

The heat-resistant layer may have a thickness of 1 μm to 5 μm, and the adhesive layer may have a thickness of 0.4 μm to 1.4 μm.

The coating layer may further include an organic filler, and the organic filler may be included in at least one of a heat-resistant layer and an adhesive layer.

The organic filler may have an average particle diameter of 120 nm to 500 nm.

A volume ratio of the inorganic particles: the adhesive binder and the organic filler may be 33:1 to 1:1.

The first structural unit may be included in an amount of 55 mol % to 99 mol % based on 100 mol % of the (meth)acrylic copolymer and the second structural unit and third structural unit may be each independently included in an amount of 0.5 mol % to 40 mol % based on 100 mol % of the (meth)acrylic copolymer.

The second structural unit derived from the (meth)acrylonitrile may be included in an amount of 0.5 to 40 mol % based on 100 mol % of the acrylic copolymer and the third structural unit derived from the (meth)acrylamidosulfonic acid, (meth)acrylamidosulfonate salt, or combination thereof may be included in an amount of 0.5 mol % to 10 mol % based on 100 mol % of the acrylic copolymer.

The first structural unit derived from (meth)acrylamide may be included in an amount of 85 mol % to 99 mol % based on 100 mol % of the acrylic copolymer, the second structural unit derived from the (meth)acrylonitrile may be included in an amount of 0.5 mol % to 10 mol % based on 100 mol % of the acrylic copolymer, and the third structural unit derived from the (meth)acrylamidosulfonic acid, (meth)acrylamidosulfonate salt, or combination thereof may be included in an amount of 0.5 to 5 mol % based on 100 mol % of the acrylic copolymer.

The first structural unit derived from (meth)acrylamide may be represented by Chemical Formula 1, the second structural unit derived from the (meth)acrylonitrile may be represented by Chemical Formula 2, and the third structural unit derived from the (meth)acrylamidosulfonic acid, (meth)acrylamidosulfonate salt, or combination thereof may be represented by one of Chemical Formula 3, Chemical Formula 4, Chemical Formula 5, and a combination thereof:

[Chemical Formula 1]

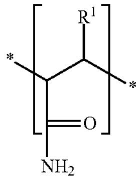

[Chemical Formula 2]

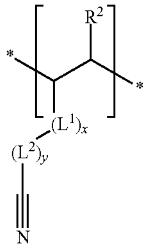

[Chemical Formula 3]

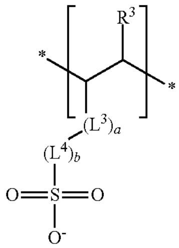

[Chemical Formula 4]

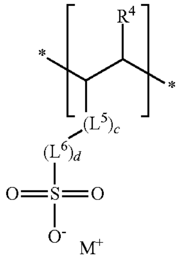

[Chemical Formula 5]

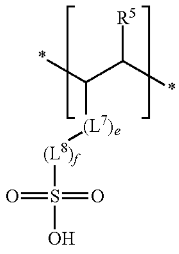

In Chemical Formula 1 to Chemical Formula 5, $R^1$ is hydrogen or a methyl group, $R^2$, $R^3$, $R^4$, and $R^5$ are each independently hydrogen or a C1 to C3 alkyl group, $L^1$, $L^3$, $L^5$, and $L^7$ are each independently —C(═O)—, —C(═O)O—, —OC(═O)—, —O—, or —C(═O)NH—, $L^2$, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, x and y are each independently an integer of 0 to 2, a, b, c, d, e, and f are each independently an integer of 0 to 2, and $M^+$ is an alkali metal.

In another embodiment, a lithium secondary battery includes a positive electrode, a negative electrode, and the separator for a lithium secondary battery between the positive electrode and the negative electrode.

Advantageous Effects

A lithium secondary battery having excellent cycle-life characteristics including a separator for a lithium secondary battery having excellent heat resistance and adhesive strength may be implemented.

DESCRIPTION OF SYMBOLS

Figure 1:
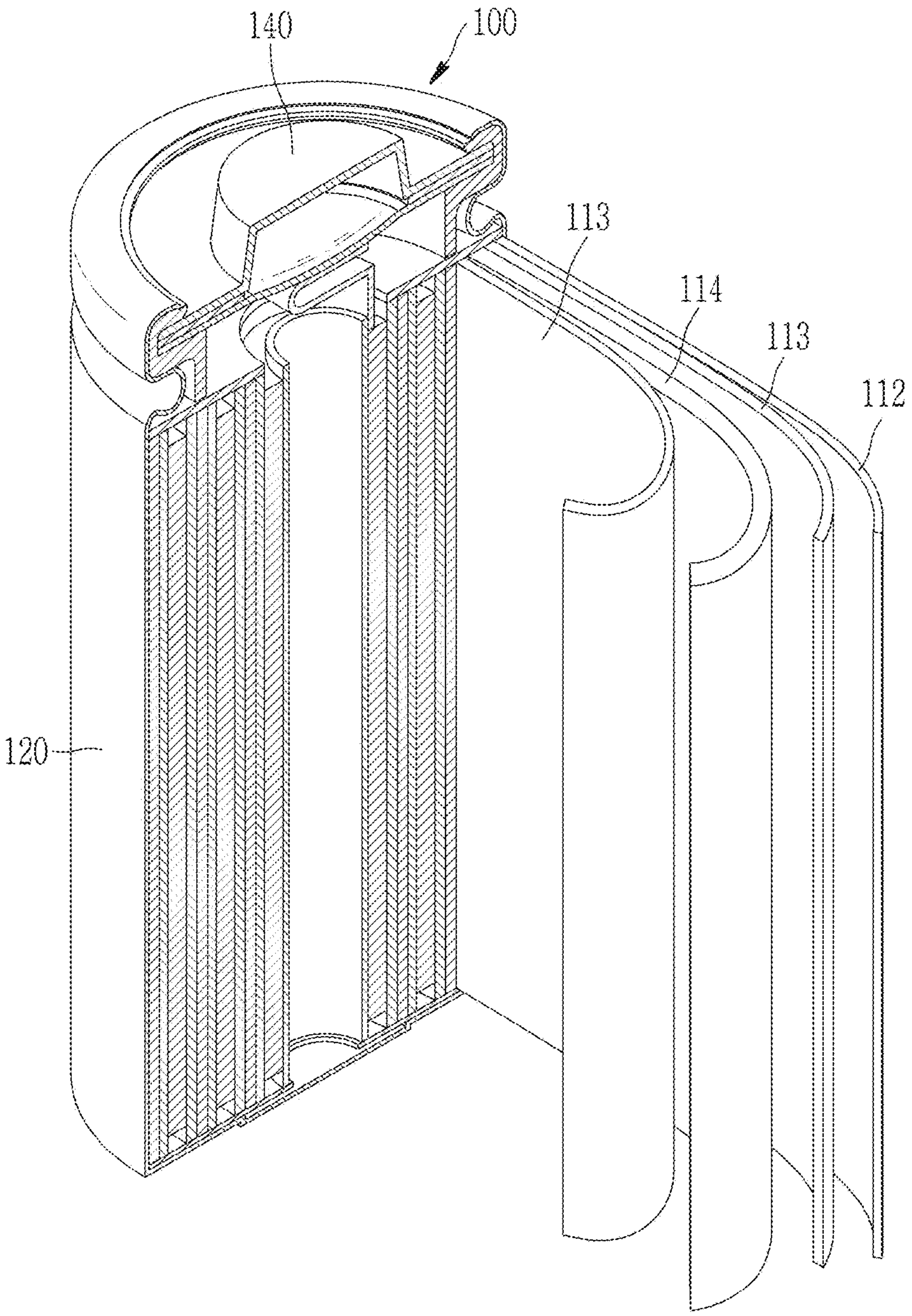
FIG. 1 is an exploded perspective view of a lithium secondary battery according to an embodiment.

1: adhesive binder
2: inorganic particle
3: organic filler
10, 10': adhesive layer
20: heat-resistant layer
30, 30': coating layer
100: lithium secondary battery
112: negative electrode
113: separator
114: positive electrode
120: battery case
140: sealing member

BEST MODE

Hereinafter, embodiments of the present invention are described in detail. However, these embodiments are exemplary, the present invention is not limited thereto and the present invention is defined by the scope of claims.

In the present specification, when a definition is not otherwise provided "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

In the present specification, when a definition is not otherwise provided, the term "hetero" refers to one including 1 to 3 heteroatoms selected from N, O, S, and P.

In the present specification, when a definition is not otherwise provided, "heterocyclic group" refers to a substituted or unsubstituted C3 to C20 heterocycloalkylene group or a substituted or unsubstituted C6 to C20 heteroarylene group.

In the present specification, "(meth)acrylic" refers to acrylic or methacrylic.

In the present specification "combination thereof" refers to a mixture, a copolymer, a blend, an alloy, a composite, a reaction product of components.

A separator for a lithium secondary battery according to an embodiment includes a porous substrate and a coating layer on one surface or both surfaces of the porous substrate.

The porous substrate may have a plurality of pore and may generally be a porous substrate used in an electrochemical device. Non-limiting examples of the porous substrate may be a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, a polyphenylene oxide, a cyclic olefin copolymer, polyphenylene sulfide, polyethylene naphthalate, a glass fiber, Teflon, and polytetrafluoroethylene.

The porous substrate may be, for example, a polyolefin-based substrate including polyolefin, and the polyolefin-based substrate has excellent shutdown function, thereby contributing to improvement of the safety of a battery. The polyolefin-based substrate may be, for example, selected from selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate may have a thickness of about 1 μm to 40 μm, for example 1 μm to 30 μm, 1 μm to 20 μm, 5 μm to 15 μm, or 10 μm to 15 μm.

The coating layer on the porous substrate may include a heat-resistant binder, an adhesive binder, and inorganic particles.

The heat-resistant binder may include a (meth)acrylic copolymer including a first structural unit derived from (meth)acrylamide, a second structural unit derived from (meth)acrylonitrile, and a third structural unit derived from (meth)acrylamidosulfonic acid, a (meth)acrylamidosulfonate salt, or a combination thereof.

The first structural unit derived from the (meth)acrylamide includes an amide functional group ($-NH_2$) in the structural unit. The $-NH_2$ functional group may improve adhesion characteristics of the porous substrate and the electrode, and by forming a hydrogen bond with the —OH functional group of the inorganic particles described later, the inorganic particles may be more firmly fixed in the coating layer, and thus the heat resistance of the separator may be strengthened.

The second structural unit derived from the (meth)acrylonitrile includes a nitrile group, thereby improving oxidation resistance of the separator and reducing the moisture content.

The third structural unit derived from the (meth)acrylamidosulfonic acid, (meth)acrylamidosulfonate salt, or combination thereof includes a bulky functional group, thereby reducing the mobility of the (meth)acrylic copolymer, and enhancing heat resistance.

The first structural unit may be included in an amount of 55 to 99 mol %, for example, in an amount of 85 to 99 mol %, based on 100 mol % of the (meth)acrylic copolymer.

The second structural unit may be included in an amount of 0.5 mol % to 40 mol %, for example, greater than or equal to 0.5 mol %, greater than or equal to 1 mol %, greater than or equal to 1.5 mol %, or greater than or equal to 2.0 mol % and less than or equal to 4.0 mol %, less than or equal to 35 mol %, less than or equal to 30 mol %, less than or equal to 25 mol %, less than or equal to 20 mol %, or less than or equal to 10 mol % based on 100 mol % of the (meth)acrylic copolymer.

The third structural unit may be included in an amount of 0.5 to 40 mol %, for example greater than or equal to 0.5 mol %, greater than or equal to 1 mol %, greater than or equal to 1.5 mol %, or greater than or equal to 2.0 mol % and less than or equal to 4.0 mol %, less than or equal to 35 mol %, less than or equal to 30 mol %, less than or equal to 25 mol %, less than or equal to 20 mol %, less than or equal to 10 mol %, or less than or equal to 5 mol % based on 100 mol % of the (meth)acrylic copolymer.

The first structural unit derived from the (meth)acrylamide may be, for example, represented by Chemical Formula 1.

[Chemical Formula 1]

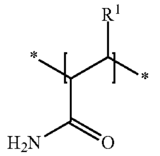

In Chemical Formula 1, $R^1$ is hydrogen or a C1 to C6 alkyl group.

The second structural unit derived from the (meth)acrylonitrile may be represented by Chemical Formula 2.

[Chemical Formula 2]

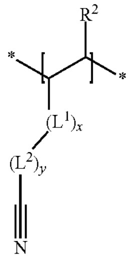

In Chemical Formula 2, $R^2$ is hydrogen or a C1 to C3 alkyl group, $L^1$ is —C(=O)—, —C(=O)O—, —OC(=O)—, —O—, or —C(=O)NH—, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and x and y are each independently an integer of 0 to 2.

The second structural unit derived from the (meth)acrylonitrile may be, for example, a structural unit derived from (meth)acrylonitrile or cyanoalkyl (meth)acrylate. Here, the alkyl may be C1 to C20 alkyl, C1 to C10 alkyl, or C1 to C6 alkyl.

The cyanoalkyl (meth) acrylate may be, for example, cyanomethyl (meth) acrylate, cyanoethyl (meth) acrylate, cyanopropyl (meth) acrylate, cyanooctyl (meth) acrylate, etc.

The structural unit derived from the (meth)acrylamidosulfonic acid, (meth)acrylamidosulfonate salt or combination thereof may be a structural unit derived from (meth) acrylamido sulfonic acid or (meth)acrylamido sulfonate, wherein the (meth)acrylamido sulfonate may be a conjugate base of the (meth)acrylamido sulfonic acid, (meth)acrylamido sulfonate salt, or a derivative thereof. The structural unit derived from the (meth)acrylamidosulfonic acid or (meth)acrylamidosulfonate may be, for example, represented by one of Chemical Formula 3, Chemical Formula 4, Chemical Formula 5, and a combination thereof.

[Chemical Formula 3]

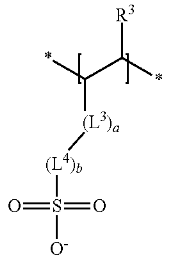

[Chemical Formula 4]

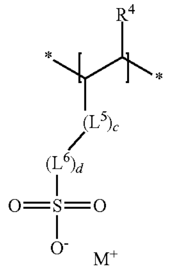

[Chemical Formula 5]

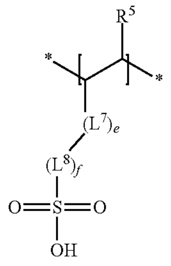

In Chemical Formula 3 to Chemical Formula 5, $R^3$, $R^4$, and $R^5$ are each independently hydrogen or a C1 to C3 alkyl group, $L^3$, $L^5$, and $L^7$ are each independently —C(═O)—, —C(═O)O—, —OC(═O)—, —O—, or —C(═O)NH—, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, c, d, e, and f are each independently an integer of 0 to 2, and M is an alkali metal, wherein the alkali metal may be for example lithium, sodium, potassium, rubidium, or cesium.

For example, in Chemical Formulas 3 to 5, $L^3$, $L^5$, and $L^7$ may all be —C(═O)NH—, $L^4$, $L^6$, and $L^8$ may each independently be a substituted or unsubstituted C1 to C10 alkylenyl, and a, b and c may each be 1.

The third structural unit derived from the (meth)acrylamidosulfonic acid, (meth)acrylamidosulfonate salt, or combination thereof may include each of a structural unit represented by Chemical Formula 3, a structural unit represented by Chemical Formula 4, and a structural unit represented by Chemical Formula 5, or two or more types therefrom. As one example, the structural unit represented by Chemical Formula 4 may be included, and as another example, the structural unit represented by Chemical Formula 4 and the structural unit represented by Chemical Formula 5 may be included together.

When the structural unit represented by Chemical Formula 4 and the structural unit represented by Chemical Formula 5 are included together, the structural unit represented by Chemical Formula 4 and the structural unit represented by Chemical Formula 5 may be, for example, included in a mole ratio of 10:1 to 1:2, 5:1 to 1:1, or 3:1 to 1:1.

A sulfonate group in the third structural unit derived from the (meth)acrylamidosulfonic acid, (meth)acrylamidosulfonate salt, or combination thereof may be for example a functional group derived from vinyl sulfonic acid, allyl sulfonic acid, styrene sulfonic acid, anethole sulfonic acid, acrylamidoalkane sulfonic acid, sulfoalkyl (meth)acrylate, or a salt thereof.

Herein, the alkane may be C1 to C20 alkane, C1 to C10 alkane, or C1 to C6 alkane and the alkyl may be C1 to C20 alkyl, C1 to C10 alkyl, or C1 to C6 alkyl. The salt refers to a salt composed of the aforementioned sulfonic acid and appropriate ions. The ion may be for example an alkali metal ion and in this case, the salt may be an alkali metal sulfonate salt.

The acryl amidoalkane sulfonic acid may be for example 2-acrylamido-2-methylpropane sulfonic acid and the sulfoalkyl (meth)acrylate may be for example 2-sulfoethyl (meth)acrylate, 3-sulfopropyl (meth)acrylate, and the like.

The (meth)acrylic copolymer may be for example represented by Chemical Formula 6.

[Chemical Formula 6]

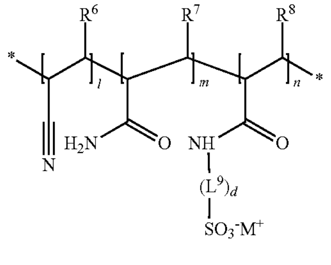

In Chemical Formula 6, $R^6$ to $R^8$ are each independently hydrogen or methyl group, $L^9$는 a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, d is one of integers of 0 to 2, M is an alkali metal of lithium, sodium, potassium, rubidium, or cesium, and l, m, and n refers to a mole ratio of each unit.

For example, in Chemical Formula 6, l+m+n=1. In addition, for example, l, m, and n may satisfy $0.01 \leq (l+n) \leq 0.45$, $0.55 \leq m \leq 0.99$, specifically $0.005 \leq l \leq 0.4$ and $0.005 \leq n \leq 0.1$, for example $0.85 \leq m \leq 0.99$, $0.005 \leq l \leq 0.1$, and $0.005 \leq n \leq 0.05$.

In the (meth)acrylicacrylic copolymer, the structural unit substituted with the alkali metal ($M^+$) may be 50 mol % to 100 mol %, for example 60 mol % to 90 mol % or 70 mol % to 90 mol % based on a total amount, 100 mol %, of the (meth)acrylamido sulfonic acid structural unit. When the ranges are satisfied, the (meth)acrylic copolymer and the separator including the same may exhibit improved adhesive strength, heat resistance, and oxidation resistance.

The (meth)acrylic copolymer may further include other units in addition to the units. For example the (meth)acrylic copolymer may further include a unit derived from alkyl (meth)acrylate, a unit derived from a diene-based monomer, a unit derived from a styrene-based monomer, an ester group-containing unit, a carbonate group-containing unit, or a combination thereof.

The (meth)acrylic copolymer may have various forms, that is, an alternate polymer where the units are alternately distributed, a random polymer the units are randomly distributed, or a graft polymer where a part of structural unit is grafted.

A weight average molecular weight of the (meth)acrylic copolymer may be 350,000 to 970,000, for example 400,000 to 970,000, or 410,000 to 700,000. When the weight average molecular weight of the (meth)acrylic copolymer satisfies the ranges, the (meth)acrylic copolymer and the separator including the same may exhibit excellent adhesive strength, heat resistance, and air permeability. The weight average molecular weight may be polystyrene-reduced average molecular weight measured by gel permeation chromatography.

The (meth)acrylic copolymer may be prepared by various methods such as emulsion polymerization, suspension polymerization, massive polymerization, solution polymerization, or bulk polymerization.

The adhesive binder has a core-shell structure, specifically, may be a (meth)acrylic polymer including a structural unit derived from (meth)acrylic acid or (meth)acrylate and a structural unit derived from a monomer including a polymerizable unsaturated group.

More specifically, a core of the adhesive binder includes a structural unit derived from (meth)acrylic acid or (meth) acrylate and a shell of the adhesive binder may include the structural unit derived from a monomer including a polymerizable unsaturated group.

In the separator according to an embodiment, the heat-resistant binder including the aforementioned (meth)acrylic copolymer serves to secure heat resistance to reduce the heat shrinkage rate at high temperature of the separator, and the adhesive binder secures adhesive strength to the electrode of the separator. The heat resistance and adhesive strength are in a trade-off relationship with each other. In an embodiment, by further including the adhesive binder together with the heat-resistant binder, the heat-resistant binder and the adhesive binder each independently exist in the coating layer, so that a separator having excellent heat resistance and adhesive strength may be implemented.

In addition, the separator may maintain heat resistance and adhesive strength due to the adhesive binder, and may improve battery stability and cycle-life, and also improve the resistance of the battery when used in a battery.

The structural unit derived from (meth)acrylic acid or (meth)acrylate included in the core of the adhesive binder may be represented by one of Chemical Formula 7, Chemical Formula 8, and a combination thereof.

[Chemical Formula 7]

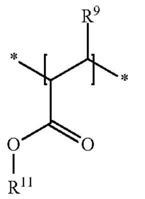

[Chemical Formula 8]

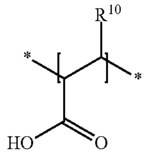

In Chemical Formula 7 and Chemical Formula 8, $R^9$ and $R^{10}$ are each independently hydrogen or a C1 to C6 alkyl group, and $R^{11}$ is a substituted or unsubstituted C1 to C20 alkyl group.

The structural unit derived from (meth)acrylate may be derived from (meth)acrylic acid alkyl ester, (meth)acrylic acid perfluoroalkyl ester, and (meth)acrylate having a functional group in the side chain. It may be, for example, derived from (meth)acrylate alkyl ester. In addition, the number of carbon atoms of the alkyl group or perfluoroalkyl group bound to the noncarbonyl oxygen atom of the (meth) acrylic acid alkyl ester or (meth)acrylic acid perfluoroalkyl ester may be specifically 1 to 20, more specifically 1 to 10, for example, 1 to 5.

The monomer including a polymerizable unsaturated group included in the shell of the adhesive binder may be at least one selected from a styrene-based monomer, an acid-derived monomer, and a combination thereof.

Specifically, the styrene-based monomer may include at least one aromatic vinyl monomer represented by Chemical Formula 9.

[Chemical Formula 9]

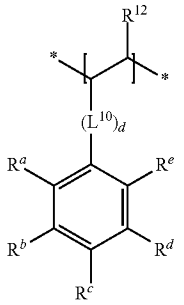

In Chemical Formula 9, $R^{12}$ is hydrogen or a C1 to C6 alkyl group, $R^a$ to $R^e$ are each independently hydrogen or a C1 to C6 alkyl group, $L^{10}$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, d is one of integers of 0 to 2, and * is a linking point.

Specifically, the styrene-based monomer may be at least one selected from methyl styrene, bromo styrene, chloro styrene, and a combination thereof as well as styrene.

More specifically, the acid-derived monomer includes a substituent corresponding to —COOH and may be at least one selected from itaconic acid, (meth)acrylic acid, and a combination thereof.

Herein, the adhesive binder may be crosslinked or non-crosslinked. In order to prepare a crosslinked (meth)acrylic polymer, a crosslinking agent may be further added in the polymerization.

The acrylic adhesive binder may have a glass transition temperature of greater than or equal to 50° C. and less than or equal to 110° C., if it is present.

Within the range, satisfactory ion conductivity as well as excellent adhesive strength to the electrode is obtained.

The adhesive binder may have a predetermined swelling degree with respect to the electrolyte. Specifically, the mass increase rate (swelling degree) due to the electrolyte when left to stand at 60° C. for 72 hours may be 50 to 500%.

When the swelling degree for the electrolyte exceeds the upper limit, the adhesion area of the coating layer in the electrolyte may be increased, but the adhesive strength due to swelling may be reduced and the passage of Li ions may be blocked to increase battery resistance.

On the other hand, when the swelling degree for the electrolyte is less than the lower limit, the electrode-separator interface may be detached off during use because adhesion with the electrode does not occur smoothly, resulting in an increase in side reactions leading to a decrease in battery reliability.

Herein, as the electrolyte used to measure the swelling degree for the electrolyte, a solution obtained by dissolving $LiPF_6$ (as a supporting electrolyte at a concentration of 1 mol/L) in a mixed solvent of ethylene carbonate (EC), diethyl carbonate (DEC), and dimethyl carbonate (DMC) (volume mixing ratio: EC/DEC/DMC=2/4/4) is used.

The swelling degree for the electrolyte may be specifically measured as follows.

First, a polymer is prepared. After that, a film is produced from the prepared polymer. For example, if the polymer is a solid, after drying the polymer under the conditions of a temperature of 85° C. and 48 hours, the polymer is molded into a film to produce a film having a thickness of 0.5 mm. In addition, for example, if the polymer is a solution or dispersion such as latex, the solution or dispersion is placed in a polytetrafluoroethylene sachet and dried at a temperature of 85° C. for 48 hours to produce a film with a thickness of 0.5 mm.

Next, the film produced as described above is cut into a 1 cm square to obtain a specimen. Measure the weight of this specimen and make it $W_0$. Further, the specimen is immersed in the electrolyte at a temperature of 60° C. for 72 hours, and the specimen is taken out from the electrolyte. The electrolyte on the surface is wiped off of the specimen, and the weight $W_1$ of the specimen after immersion is measured.

Using these weights $W_0$ and $W_1$, the swelling degree S (times) is calculated as $S=W_1/W_0$.

In addition, a method of adjusting the swelling degree for the electrolyte of the polymer may be, for example, appropriately selecting the type and amount of the monomers for producing the polymer, considering a SP value of the electrolyte.

In addition, the monomers used to produce the polymer of the shell, one in which the swelling degree for the electrolyte of the polymer falls within the above range may be selected and used. As such a monomer, for example, one type may be used alone, or two or more types may be used in combination at an arbitrary ratio.

For example, aromatic vinyl monomers are desirable. That is, it is desirable that the polymer of the shell includes an aromatic vinyl monomer unit. Moreover, among aromatic vinyl monomers, styrene derivatives, such as styrene and styrene sulfonic acid, may be more desirable. When an aromatic vinyl monomer is used, the swelling degree for the electrolyte of the polymer may be easily adjusted. In addition, the adherence of the coating layer may be further increased.

A proportion of the aromatic vinyl monomer unit in the polymer of the shell may be desirably greater than or equal to 20 mass %, more desirably greater than or equal to 40 mass %, still more desirably greater than or equal to 50 mass %, even more desirably greater than or equal to 60 mass %, particularly greater than or equal to 80 mass %, and desirably less than or equal to 100 mass %, more desirably less than or equal to 99.5 mass %, and still more desirably less than or equal to 99 mass %. By making the proportion of the aromatic vinyl monomer unit fall within the above range, it is easy to control the swelling degree for the electrolyte of the shell within the above range. In addition, it is possible to further increase the adhesive strength of the coating layer in the electrolyte.

In addition, the shape of the shell is not particularly limited, but it is preferable that the shell is made of a particulate polymer.

When the shell is made of the particulate polymer, a plurality of particles constituting the shell may be overlapped in the radial direction of the particles. However, in the radial direction of the particles, it is preferable that the particles constituting the shell are not overlapped, and the particles of the polymer constitute the shell portion in a single layer.

The adhesive binder may have an average particle diameter of 0.2 μm to 1.0 μm, specifically 0.2 μm to 0.7 μm, for example 0.3 μm to 0.7 μm, or 0.4 μm to 0.7 μm. The particle diameter may be adjusted by controlling an initiator addition amount, an emulsifier addition amount, a reaction temperature, an agitation speed, and the like.

The adhesive binder may be included in an amount of 1 to 20 wt %, specifically 5 to 20 wt %, 5 to 15 wt %, for example 5 to 10 wt % based on the total amount of the coating layer. When the adhesive binder is included in a less amount than the low limit, adhesive strength to the electrode is not realized, but when the adhesive binder is included in a larger amount than the upper limit, capacity may be limitedly realized due to a battery resistance increase.

The coating layer the porous substrate according to an embodiment may include inorganic particles in addition to the aforementioned acrylic heat-resistant binder and adhesive binder.

The inorganic particles may prevent a separator from being sharply shrunk due to a temperature increase. The inorganic particles may be a ceramic material capable of improving heat resistance, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. The inorganic particles may have a spherical shape, a sheet shape, a cubic shape, or an amorphous shape. The inorganic particles may have an average particle diameter of 0.2 μm to 1.0 μm, specifically 0.3 μm to 1.0 μm, for example 0.3 μm to 0.7 μm.

The average particle diameter of the inorganic particles may be particle size ($D_{50}$) at a volume ratio of 50% in a cumulative size-distribution curve. By using the inorganic particles having an average particle diameter within the ranges, the coating layer may have an appropriate strength, thereby improving heat resistance, durability, and stability of the separator.

On the other hand, the coating layer may include the heat-resistant binder including the (meth)acrylic copolymer: the inorganic particles in a weight ratio of 1:20 to 1:40, desirably 1:25 to 1:40, more desirably 1:25 to 1:35. When the (meth)acrylic copolymer, adhesive binder, and inorganic particles are included in the above range in the coating layer, the separator may exhibit excellent heat resistance and air permeability. When the weight ratio of the heat-resistant binder and the inorganic particles is less than 1:20, the porosity of the coating layer may be lowered by the (meth) acrylic copolymer binder, thereby limiting the mobility of Li ions, and the moisture adsorption amount of the binder increases, resulting in deterioration of battery characteristics. In addition, when the weight ratio of the heat-resistant binder and the inorganic particles exceeds 1:40, heat resistance may be weakened due to insufficient content of the binder to adhere the inorganic particles.

The coating layer may further include an organic filler.

In particular, as a portion of the volume occupied by the inorganic particles is replaced with an organic filler, an increase in the moisture content due to the specific surface area of the inorganic particles is suppressed, thereby contributing to improvement of cell cycle-life characteristics.

The average particle diameter of the organic filler may be 120 nm to 500 nm, specifically 120 nm to 350 nm, 130 nm to 350 nm, or 140 nm to 330 nm, for example 150 nm to 300 nm. When the organic filler having the average particle diameter within the above range is used, the coating density of the coating layer is increased, and the contact area between the inorganic particles through the organic filler is increased, thereby providing a separator having excellent heat resistance.

As an example, the inorganic particles: the adhesive binder and the organic filler may have a volume ratio of 33:1 to 1:1, for example, 30:1 to 1:1, or 20:1 to 1:1, and for a specific example, it may be 10:1 to 1:1, or 5:1 to 1:1, for example, 4:1 to 1:1, or 3:1 to 1:1. As the inorganic particles are replaced with the adhesive binder and the organic filler in the above ratio, the surface roughness of the coating layer is improved, and the coating uniformity of the subsequently coated adhesive layer is improved to improve adherence to the electrode. In addition, the inhibitory effect of increasing the moisture content of the coating layer due to the hydrophobic properties of the inorganic particles may be maximized.

Meanwhile, the organic filler may be included in an amount of 0.1 to 50 wt % based on the total amount of the coating layer. When the content of the organic filler is within the above range, excellent heat resistance may be secured. For example, the organic filler may be included in an amount of 1 to 50 wt %, 3 to 50 wt %, or 5 to 50 wt % based on the total amount of the coating layer. For example the organic filler may be included in an amount of 5 wt %, 10 wt %, 20 wt %, 25 wt % or 50 wt % based on the total amount of the coating layer, but is not limited thereto.

The organic filler may be at least one organic compound selected from a (meth)acrylate-based compound and a derivative thereof, a diallyl phthalate-based compound and a derivative thereof, a polyimide-based compound and a derivative thereof, a copolymer thereof, and a mixture thereof.

The organic filler may be specifically obtained through the following methods.

After dispersing the (meth)acrylate-based compound in an emulsifier, a trace amount of an aqueous copper sulfate solution is added thereto, and then a redox polymerization initiator is added thereto, followed by emulsion polymerization to obtain the organic filler.

Further, the organic filler may be obtained by polymerizing the diallyl phthalate-based compound in the presence of a water-soluble polymerization initiator.

In addition, the organic filler may be obtained by reacting an aldehyde-based compound with emulsion particles composed of a core part made of a hydrophobic polymer and a shell part made of a hydrophilic polymer. At this time, the hydrophobic polymer has a glass transition temperature of greater than or equal 20° C. and an acetacetyl group, and the hydrophilic polymer has a functional group capable of being dispersed in water.

In addition, an organic filler may be obtained as follows: after preparing a polyimide fine particle dispersion in which the polyamic acid fine particles dispersed in a hydrophilic solvent are imidized with acetic anhydride, pyridine, etc., the hydrophilic solvent is removed by centrifugation, and then an aqueous surfactant solution is added to the remaining by-products to replace water to obtain the organic filler.

More specifically, the organic filler may have a highly crosslinked structure.

In an embodiment of the present invention, the organic filler may be a polymer material such as an acrylate-based or methacrylate-based polymer or copolymer. In this case, the glass transition temperature of the polymer may be controlled by controlling the monomer ratio of the polymer or copolymer. For example, an acrylate-based or methacrylate-based polymer or copolymer having a glass transition temperature of 30 to 90° C. can be used. However, the present invention is not limited thereto.

The separator for a lithium secondary battery may be manufactured by known various methods. For example, the separator for a lithium secondary battery may be formed by coating a composition for forming a coating layer on one surface or both surfaces of the porous substrate and then drying the same.

Meanwhile, the composition for forming the coating layer may include an initiator and a solvent in addition to the heat-resistant binder including the (meth)acrylic copolymer, adhesive binder, and inorganic particles.

The initiator may be, for example, a photoinitiator, a thermal initiator, or a combination thereof. The photoinitiator may be used for curing by a photo-polymerization using ultraviolet rays.

Examples of the photoinitiator may be acetophenones such as diethoxyacetophenone, 2-hydroxy-2-methyl-1-phenylpropan-1-one, benzyldimethylketal, 1-hydroxycyclohexyl-phenylketone, and 2-methyl-2-morphine(4-thiomethylphenyl)propan-1-one; benzoinethers such as benzoinmethylether, benzoinethylether, benzoinisopropylether, and benzoinisobutylether; benzophenones such as benzophenone, o-benzoyl methyl benzoate, 4-phenylbenzophenone, 4-benzoyl-4'-methyldiphenylsulfurous acid, 4-benzoyl-N,N-dimethyl-N-[2-(1-oxo-2-propenyloxy) ethyl] benzenemetanamium bromide, and (4-benzoylbenzyl)

trimethylammoniumchlorde; thioxanthones such as 2,4-diethylthioxanthone, and 1-chloro-4-dichlorothioxanthone; 2,4,6-trimethylbenzoyldiphenylbenzoyloxide, and the like, which may be used alone or as a mixture of two or more.

The thermal initiator may be used for a thermal polymerization. The thermal initiator may include organic peroxide free radical initiator such as diacylperoxides, peroxyketals, ketone peroxides, hydroperoxides, dialkylperoxides, peroxyesters, peroxydicarbonates, and for example, lauroyl peroxide, benzoyl peroxide, cyclohexanone peroxide, 1,1-bis(t-butylperoxy)-3,3,5-trimethyl cyclohexane, t-butyl hydroperoxide which may be used alone or as a mixture of two or more.

The curing may be performed through photocuring, thermal curing, or a combination thereof. The photocuring may be for example performed by radiating ultraviolet (UV) of 150 nm to 170 nm for 5 seconds to 60 seconds.

In addition, the thermal curing may be for example performed at 60° C. to 120° C. for 1 hour to 36 hours, for example, 80° C. to 100° C. for 10 hours to 24 hours.

The solvent is not particularly limited as long as it can dissolve or disperse the heat-resistant binder, the adhesive binder, and the inorganic particles. In an embodiment, the solvent may be an aqueous solvent including water, alcohol, or a combination thereof, and in this case, there is an advantage of being environmentally friendly.

The coating may be performed by, for example, spin coating, dip coating, bar coating, die coating, slit coating, roll coating, inkjet printing, etc., but is not limited thereto.

The drying may be, for example, performed through drying with warm air, hot air, or low humid air, vacuum-drying, or radiation of a far-infrared ray, an electron beam, and the like, but is not limited thereto. The drying process may be, for example, performed at a temperature of 25° C. to 120° C.

In an embodiment, the coating layer may include a heat-resistant layer on the porous substrate, and an adhesive layer on the heat-resistant layer, wherein the heat-resistant binder and inorganic particles may be included in the heat-resistant layer and the adhesive binder may be included in the adhesive layer.

The coating layer may optionally include an organic filler, and the organic filler may be included in at least one of a heat-resistant layer and an adhesive layer. For example, the organic filler may be included in the heat-resistant layer or the adhesive layer, or included in both. When the organic filler is further included in the heat-resistant layer, withstand voltage characteristics may be enhanced.

The coating layer may have a thickness of about 1 μm to 6.5 μm, for example, a thickness of 2 μm to 5 μm.

For example, the thickness of the heat-resistant layer may be 1 μm to 5 μm, and the thickness of the adhesive layer may be 0.4 μm to 1.4 μm, for example, the thickness of the heat-resistant layer is 1.5 μm to 3 μm, and the thickness of the adhesive layer is 0.5 μm to 1.0 μm.

When the thickness of the heat-resistant layer and the adhesive layer are respectively as described above, heat resistance and adherence to the electrode may be simultaneously expressed, thereby improving battery safety and reliability. When the thickness of the heat-resistant layer is less than the lower limit, the separator shrinks at high temperature and safety cannot be secured. When the thickness exceeds the upper limit, the heat resistance is improved, but performance may be deteriorated due to an increase in moisture content by the coating layer and resistance increase. Since the adhesive layer is coated with one layer of the adhesive binder, the adhesive layer has a thickness similar to the average particle diameter of the adhesive binder.

A separator according to an embodiment may be described with reference to FIGS. 2 and 3.

Figure 2:
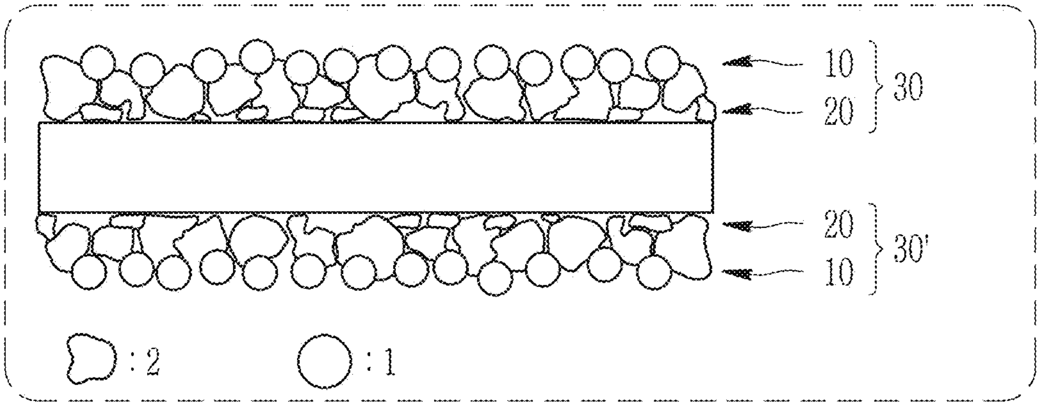
FIG. 2 is a schematic view of a separator according to an embodiment.
Figure 3:
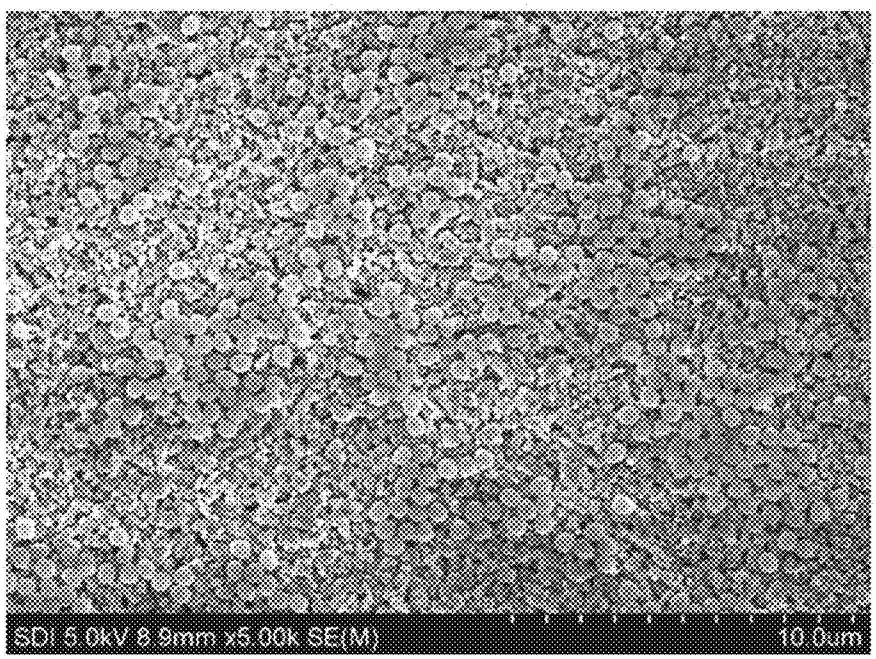
FIG. 3 is an SEM photograph of a coating layer included in the separator according to an embodiment.

FIG. 2 is a schematic view of a separator according to an embodiment and FIG. 3 is an SEM photograph of a coating layer not including an organic filler.

Referring to FIG. 2, the separator according to an embodiment may include coating layers 30' and 30 including a heat-resistant binder (not shown), an adhesive binder 1, and inorganic particles 2. In an embodiment, the coating layers 30' and 30 include a heat-resistant layer 20 on a porous substrate, and an adhesive layer 10 on the heat-resistant layer 20, wherein the heat-resistant binder and inorganic particles 2 may be included in the heat-resistant layer 20, and the adhesive binder 1 may be included in the adhesive layer 10.

A separator according to another embodiment may be described with reference to FIGS. 4 and 5.

Figure 4:
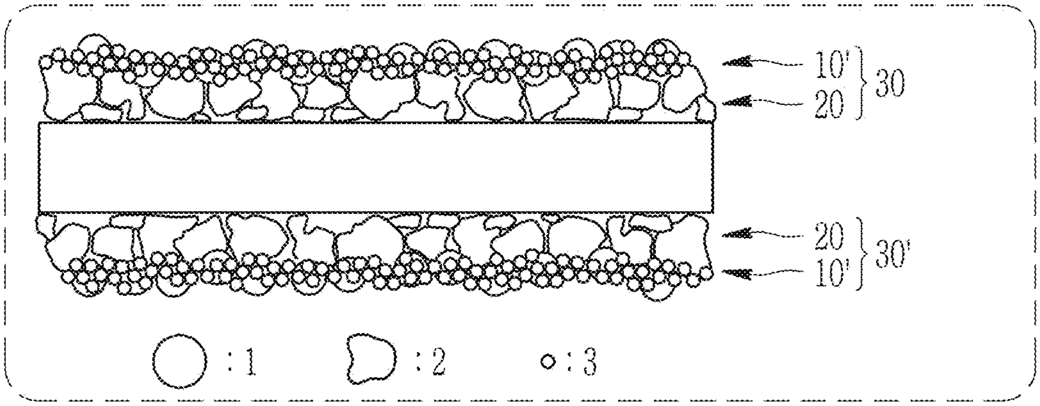
FIG. 4 is a schematic view of a separator according to another embodiment.
Figure 5:
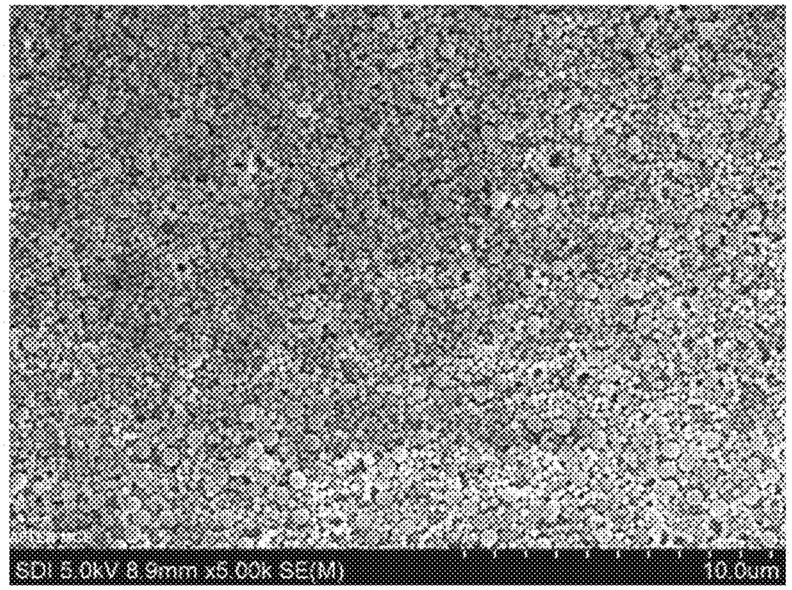
FIG. 5 is an SEM photograph of a coating layer included in a separator according to another embodiment.

FIG. 4 is a schematic view of a separator according to another embodiment and FIG. 5 is a SEM photograph of a coating layer additionally including an organic filler.

Referring to FIG. 4, a separator according to another embodiment includes coating layers 30' and 30 including a heat-resistant binder (not shown), an adhesive binder 1, inorganic particles 2, and an organic filler 3. In an embodiment, the coating layer includes a heat-resistant layer 20 on a porous substrate, and an adhesive layer 10' on the heat-resistant layer, wherein the heat-resistant binder and inorganic particles 2 may be included in the heat-resistant layer 20, and the adhesive binder 1 may be included in the adhesive layer 10'. In addition, the organic filler may be included in the adhesive layer 10'.

The separator for a lithium secondary battery may be manufactured by lamination, coextrusion, and the like besides the above method.

The separator for a lithium secondary battery according to an embodiment has excellent heat resistance. Specifically, the separator may have a shrinkage rate of less than 10% or less than or equal to 5% at high temperature. For example, after the separator is left at 150° C. for 60 minutes, the shrinkage rates in the longitudinal direction and the transverse direction of the separator measured may be less than or equal to 5%, respectively.

The separator for a lithium secondary battery according to an embodiment may exhibit excellent air permeability, and may have an air permeability of, for example, less than 160 sec/100 cc·1 $in^2$, less than or equal to 150 sec/100 cc·1 $in^2$, or less than or equal to 140 sec/100 cc·1 $in^2$. That is, the air permeability refers to the time (seconds) it takes for 100 cc of air to permeate the 1 $in^2$ area of the separator.

Hereinafter, a lithium secondary battery including the separator for a lithium secondary battery will be described.

A lithium secondary battery may be classified into a lithium ion battery, a lithium ion polymer battery, and a lithium polymer battery depending on kinds of a separator and an electrolyte and also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a lithium secondary battery, a cylindrical lithium secondary battery is exemplarily described. FIG. 1 is an exploded perspective view of a lithium secondary battery according to an embodiment.

Referring to FIG. 1, a lithium secondary battery 100 according to an embodiment includes a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114 and the separator 113, and a battery container 120, a battery case containing the battery cell, and a sealing member 140 that seals the container 120.

The positive electrode 114 may include a positive current collector and a positive active material layer formed on the positive current collector. The positive active material layer includes a positive active material, a binder, and optionally a conductive material.

The positive current collector may use aluminum (Al), nickel (Ni), and the like, but is not limited thereto.

The positive active material may use a compound capable of intercalating and deintercallating lithium. Specifically at least one of a composite oxide or a composite phosphate of a metal selected from cobalt, manganese, nickel, aluminum, iron, or a combination thereof and lithium may be used. More specifically, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, but is not limited thereto.

The negative active material layer may include a negative active material, a binder and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shaped, flake-shaped, spherically, shaped or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ ($0<x<2$), a Si—C composite, a Si—Y alloy, Sn, $SnO_2$, a Sn—C composite, a Sn—Y alloy, and the like, and at least one of these may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the positive electrode 114.

The positive electrode 114 and the negative electrode 112 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte includes an organic solvent a lithium salt.

The organic solvent serves as a medium for transmitting ions taking part in the electrochemical reaction of a battery. Examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include two or more selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

Mode for Invention

Hereinafter, the above aspects of the present disclosure are illustrated in more detail with reference to examples. However, these examples are exemplary, and the present disclosure is not limited thereto.

SYNTHESIS EXAMPLE: PREPARATION OF (METH)ACRYLIC HEAT-RESISTANT BINDER

Synthesis Example 1: AM/AN/AMPS=85/10/5, Weight Average Molecular Weight: 410,000, Glass Transition Temperature: 165° C.

Distilled water (6,361 g), acrylamide (604.2 g, 8.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent (1.05 g) based on a total amount (0.5 mol) of 2-acrylamido-2-methylpropanesulfonic acid) were added to a 10 L four-necked flask equipped with a stirrer, a thermometer, and a cooling tube, and after three times repeating an operation of reducing the internal pressure to 10 mmHg with a diaphragm pump and then, returning it to a normal pressure with nitrogen, acrylonitrile (53.1 g, 1.0 mol) was added thereto.

A reaction was performed for 12 hours, while adjusting the temperature of the reaction solution to be stabilized between 55° C. and 60° C., and cooled to room temperature.

By this method, poly(acrylamide-co-acrylonitrile-co-2-acrylamido-2-methylpropanesulfonic acid) lithium salt was prepared. A mole ratio of acrylamide, acrylonitrile, and 2-acrylamido-2-methylpropanesulfonic acid was 85:10:5. About 10 mL of the reaction solution (reaction product) was taken to measure the non-volatile component, and the result was 9.5% (theoretical value: 10%).

On the other hand, AM is acrylamide, AN is acrylonitrile, and AMPS is 2-acrylamido-2-methylpropanesulfonic acid.

EXAMPLES: PREPARATION OF SEPARATOR FOR LITHIUM SECONDARY BATTERY

Example 1

Organic-inorganic dispersion having 20% of a solid including a heat-resistant binder:inorganic particles:an organic filler in a weight ratio of 1:30:3 was prepared by adding the inorganic particles (0.3 μm, Boehmite) milled and dispersed with a bead mill at 25° C. for 30 minutes, the organic filler of crosslinked polymethylmethacrylate (150 nm, PMMA, Nippon Shokubai Co., Ltd.), and the acrylic heat-resistant binder according to Synthesis Example 1 (10 wt % in distilled water) to a water solvent and then, stirring the mixture. The organic-inorganic dispersion was coated to have each thickness of 1.5 μm and thus a total thickness of 3 μm on both surfaces of a 8 μm-thick polyethylene porous substrate (air permeability: 120 sec/100 cc, puncture strength: 480 kgf, SK Chemicals) in a bar coating method and dried at 70° C. for 10 minutes to form a heat-resistant layer of a separator for a lithium secondary battery.

Subsequently, a core-shell adhesive binder (0.6 μm, a solid: 15%, PX-SP121, ZEON Chemicals L.P.) was diluted into 2% of a solid and then, coated to have each thickness of 0.5 μm and thus a total thickness of 1 μm on the surfaces of the heat-resistant layers and dried at 50° C. for 10 minutes, manufacturing a separator for a lithium secondary battery.

Example 2

A separator for a lithium secondary battery was manufactured according to the same method as Example 1 except that dispersion prepared by mixing a heat-resistant binder: inorganic particles (0.65 μm, Boehmite) in a weight ratio of 1:30 was used to form a heat-resistant layer.

Example 3

A separator for a lithium secondary battery was manufactured according to the same method as Example 1 except that the average particle diameter of the organic filler was changed into 300 nm (300 nm, PMMA, Nippon Shokubai Co., Ltd.).

Example 4

A separator for a lithium secondary battery was manufactured according to the same method as Example 1 except that the heat resistant layers formed to have each thickness of 1.5 μm on both surfaces of a substrate was formed as a single layer having a thickness of 3 μm on one surface of the substrate.

Comparative Example 1

Inorganic particles (0.5 μm, alumina) milled and dispersed at 25° C. for 30 minutes with a bead mill were mixed with PVdF-HFP (LBG2, Arkema Inc.) in a weight ratio of 4:1 to prepare a crude acetone solution with 12% of a solid. The prepared solution was coated to have each thickness of 1.5 μm and thus a total thickness of 3 μm on both surfaces of a substrate with a dip coater and then, dried at 40° C. under humidity of 50% for 10 minutes to form a heat-resistant layer alone without the adhesive layer, manufacturing a separator for a lithium secondary battery.

Comparative Example 2

A separator for a lithium secondary battery was manufactured according to the same method as Example 1 except that inorganic particles with an average particle diameter of 1.3 μm (1.3 μm, Boehmite) and an organic filler having an average particle diameter of 300 nm (300 nm, PMMA, Nippon Shokubai Co., Ltd.) were used.

Comparative Example 3

A separator for a lithium secondary battery was manufactured according to the same method as Example 1 except that dispersion prepared by mixing a heat-resistant binder: inorganic particles (0.65 μm, Boehmite):an organic filler (300 nm, PMMA, Nippon Shokubai Co., Ltd.) in a weight ratio of 1:30:3 was used to form a heat-resistant layer alone without the adhesive layer.

Comparative Example 4

A separator for a lithium secondary battery was manufactured according to the same method as Example 1 except that polyvinyl alcohol (PVA-124, Kuraray Co., Ltd.) was used as the heat-resistant binder.

Comparative Example 5

A separator for a lithium secondary battery was manufactured according to the same method as Example 1 except that the organic filler (150 nm, PMMA, Nippon Shokubai Co., Ltd.) was changed into an organic filler (300 nm, PMMA, Nippon Shokubai Co., Ltd.) and an adhesive binder with an average particle diameter of 0.15 μm (PX-SP95, ZEON Chemicals L. P.) were used.

Each composition according to the examples and the comparative examples are shown in Table 1, and each weight ratio of the compositions is shown in Table 2.

TABLE 1

| | Coating layer | | | | | |
|---|---|---|---|---|---|---|
| | Heat-resistant layer | | | | Adhesive layer | |
| | Thickness of heat-resistant layer (μm/μm) | Composition for heat-resistant layer: Heat-resistant binder | Composition for heat-resistant layer: Inorganic particles (μm) | Composition for heat-resistant layer: Organic filler (μm) | Thickness of adhesive layer (μm/μm) | Composition for adhesive layer: Adhesive binder (μm) |
| Example 1 | 1.5/1.5 | Synthesis Example1 | 0.3 | 0.15 | 0.5/0.5 | 0.6 |
| Example 2 | 1.5/1.5 | Synthesis Example1 | 0.65 | — | 0.5/0.5 | 0.6 |
| Example 3 | 1.5/1.5 | Synthesis Example1 | 0.3 | 0.3 | 0.5/0.5 | 0.6 |
| Example 4 | 3.0/— | Synthesis Example 1 | 0.3 | 0.15 | 0.5/0.5 | 0.6 |
| Comparative Example 1 | 1.5/1.5 | PVdF-HFP | 0.5 | — | — | — |
| Comparative Example 2 | 1.5/1.5 | Synthesis Example1 | 1.3 | 0.3 | 0.5/0.5 | 0.6 |
| Comparative Example 3 | 1.5/1.5 | Synthesis Example1 | 0.65 | 0.3 | — | — |
| Comparative Example 4 | 1.5/1.5 | PVA | 0.3 | 0.15 | 0.5/0.5 | 0.6 |
| Comparative Example 5 | 1.5/1.5 | Synthesis Example1 | 0.3 | 0.3 | 0.5/0.5 | 0.15 |

TABLE 2

| | Heat-resistant binder/inorganic particle/organic filler/ adhesive binder (weight ratio) | Content of adhesive binder in the coating layer (wt %) |
|---|---|---|
| Example 1 | 1/30/3/3 | 8.1 |
| Example 2 | 1/30/0/3 | 8.8 |
| Example 3 | 1/30/3/3 | 8.1 |
| Example 4 | 1/30/3/3 | 8.1 |
| Comparative Example 1 | 1/4/0/0 | 0 |
| Comparative Example 2 | 1/30/3/3 | 8.1 |
| Comparative Example 3 | 1/30/3/0 | 0 |
| Comparative Example 4 | 1/30/3/3 | 8.1 |
| Comparative Example 5 | 1/30/3/3 | 8.1 |

EVALUATION EXAMPLES

Evaluation Example 1: Evaluation of Room Temperature Cycle-Life Characteristics (Manufacture of Secondary Battery Cell)

98 wt % of a $LiCoO_2$ positive active material, 1 wt % of a polyvinylidene fluoride binder, and 1 wt % of a ketjen black conductive material were mixed in an N-methylpyrrolidone solvent to prepare positive active material slurry. The positive active material slurry was coated on both surfaces of an aluminum current collector and then, dried and compressed, manufacturing a positive electrode having a positive active material layer.

Negative electrode active material slurry was prepared by mixing 98 wt % of artificial graphite, 0.8 wt % of carboxylmethyl cellulose, and 1.2 wt % of styrene-butadiene rubber in pure water. The negative electrode active material slurry was coated on both surfaces of a copper current collector and then, dried and compressed, manufacturing a negative electrode having a negative electrode active material layer.

The positive and negative electrodes were used to manufacture a 3000 mAh battery cell, which was specifically manufactured by winding the positive and negative electrodes with each separator according to Examples 1 to 4 and Comparative Examples 1 to 5, housing the wound product in an aluminum pouch, and injecting an electrolyte solution (prepared by mixing 1.2 M of an electrolyte $LiPF_6$ in a non-aqueous organic solvent of EC (ethylene carbonate)/PC (propylene carbonate)/PP (propyl propionate) in a volume ratio of 2:1:7), and then, degassing and sealing the pouch. The cell was pressed at 70° C. for 5 minutes with 400 Kgf to adhere the separator to the electrodes.

(Evaluation of Room Temperature Cycle-Life Characteristics)

The cells manufactured by using each separator according to Example 1 and Comparative Examples 1 and 5 were charged up to 4.4 V at a 1.0 C-rate under a constant current/constant voltage (CC/CV) condition, cut off at a 0.1 C-rate, and discharged down to 3.0 V at a 1.0 C-rate at 25° C. wherein at the first cycle and every $50^{th}$ cycle, the cells were charged at a 0.2 C-rate, cut off at a 0.1 C-rate, and discharged down to 3.0 V at a 0.2 C-rate. The charge and discharge as one cycle was 400 cycles repeated. After the 400 cycles, capacity retentions of the cells were evaluated, and the results are shown in Table 3 and FIG. 6.

TABLE 3

| | Capacity retenton (%) |
|---|---|
| Example 1 | 86.9 |
| Comparative Example 1 | 86.4 |
| Comparative Example 5 | 78.2 |

Figure 6:
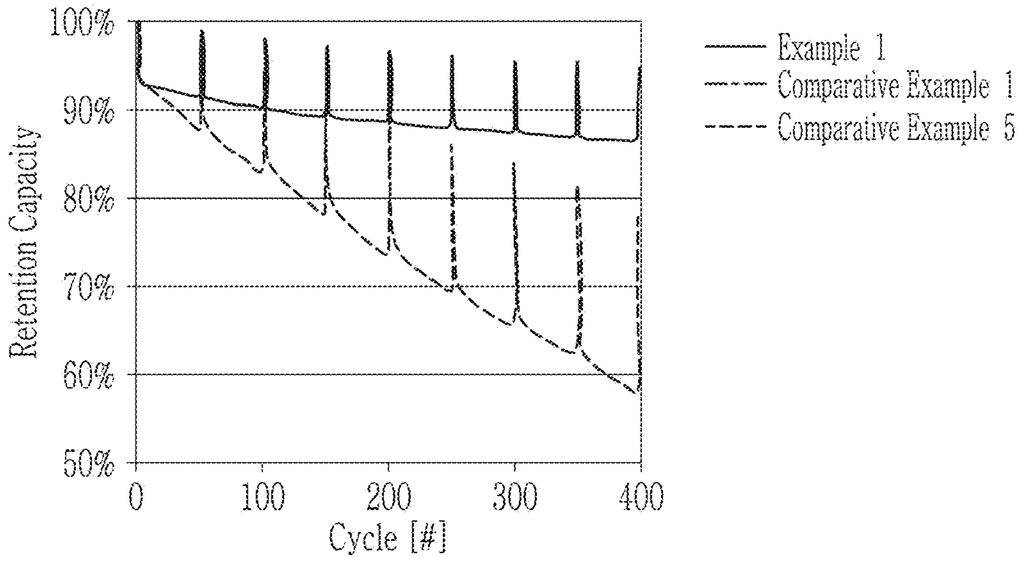
FIG. 6 is a graph showing room temperature cycle-life characteristics of a lithium secondary battery cell.

FIG. 6 is a graph showing room temperature (25° C.) cycle-life characteristics measured twice for each lithium secondary battery cell.

Referring to FIG. 6 and Table 3, the separator according to Example 1 included an adhesive binder having a core-shell structure but exhibited equal or more excellent cycle-life characteristics than the one according to Comparative Example 1 including no adhesive binder.

In general, when an adhesive binder having a core-shell structure is included, the adhesive binder is deformed during the manufacturing process or the high temperature exposure and thus may block pores of a microporous separator and thus deteriorate air permeability and/or lithium ion-transfer capability, but the present invention included a (meth)acrylic copolymer according to an example embodiment and thus improved the deterioration of air permeability and/or lithium ion-transfer capability and realized excellent cycle-life characteristics.

Particularly, when the adhesive binder had an average particle diameter of less than 200 nm (Comparative Example 5), the deformation (swelling, pressing, compressing) of the adhesive binder and the resulting pore-blocking of a coating layer was much accelerated and sharply deteriorated the lithium ion transfer capability, extremely increasing battery resistance and greatly deteriorating cycle-life characteristics.

In other words, the separator according to an example embodiment of the present invention included an adhesive binder with an appropriate particle diameter along with a (meth)acrylic copolymer and thus prevented the deterioration of air permeability and/or lithium ion-transfer capability and secured an appropriate binding force of electrode/separator.

Evaluation Example 2: Evaluation of Bending Force

A three point bending force test was performed to evaluate adhesive strength between electrodes and separator by using UTM. Specifically, the battery cells were fixed into a lower jig in a length direction and then, pressed at 100 mm/min to measure a maximum force for deformation. The higher the bending force was, the higher the adhesive strength between the electrodes and the separator was. The evaluation was performed in the stage of discharging the cells at 3.0 V after completing the initial one cycle. The separators according to Example 1 and Comparative Example 1 and 3 were used to manufacture the secondary battery cells, and each bending force evaluation result is shown in Table 4.

TABLE 4

| | Bending Force (N) |
|---|---|
| Example 1 | 310 |
| Comparative Example 1 | 301 |
| Comparative Example 3 | NG |

Referring to Table 4, the separator of the example including an adhesive binder exhibited an excellent being force, but bending forces of the separators including no adhesive binder (Comparative Examples 1 and 3) were deteriorated or immeasurable, because the separators had no adhesion function to electrodes, and accordingly, there may be problems of hardly maintaining a battery shape and thus being twisted due to an exterior material (aluminum pouch) during the charge and discharge, accelerating generation of by-products such as lithium precipitates, etc. due to nonuniform distances between electrode interfaces, and sharply increasing a battery thickness.

Evaluation Example 3: Evaluation of Shut Down/Melt Down 2016 type coin cells were manufactured by using each separator according to Example 1 and Comparative Example 1 and a PC (propylene carbonate) electrolyte solution including 1.2 M $LiPF_6$, and resistance (impedance) changes of the cells were measured, while heated up at 3° C./min. Shut down/Melt down evaluation results of the cells are shown in FIG. 7.

Figure 7:
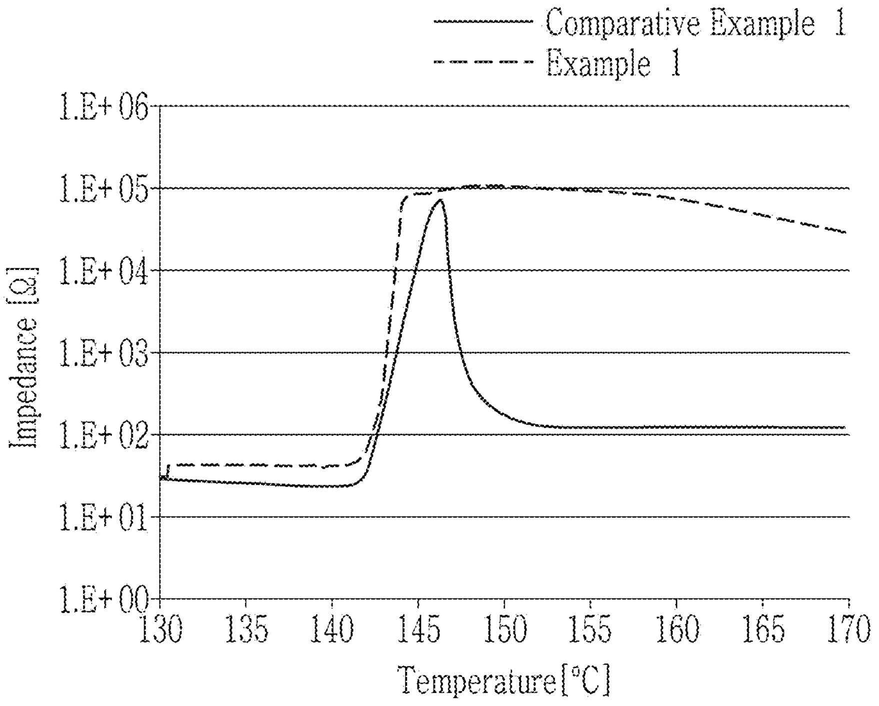
FIG. 7 is a graph showing shut down/melt down characteristics of lithium secondary battery cells according to Example 1 and Comparative Example 1.

Referring to FIG. 7, Example 1 and Comparative Example 1 all exhibited increased resistance around 142° C. due to pore-blocking of a porous substrate, but the separator of Comparative Example 1 was shrunk due to insufficient heat resistance improvement by a coating layer around 147° C. and exhibited a resistance decrease, but the separator of Example 1 maintained high heat resistance up to 170° C. due to excellent heat resistance characteristics. The reason is that the separator of Example 1 was suppressed from the shrinkage at a high temperature, and the resulting micro short circuit area was minimized.

Evaluation Example 4: Evaluation of Shrinkage of Separator after Hot Box Evaluation A hot box test was performed by placing the cells in a chamber installed with a safety apparatus, fixing them to measure a surface temperature and a voltage, and measuring a voltage, while the chamber temperature was increased. When a separator is contracted, a voltage drop may occur, and severely, ignition and explosion may occur. The separators of Example 1 and Comparative Example 1 were used to manufacture SOC 0 cells, and then, a 150° C. hot box test (allowed to stand for 1 hour after the temperature reached 150° C.) was performed to measure shrinkages of the separators at the wound end, and photographs showing the shrinkage of the wound ends of the separators are shown in FIG. 8.

Figure 8:
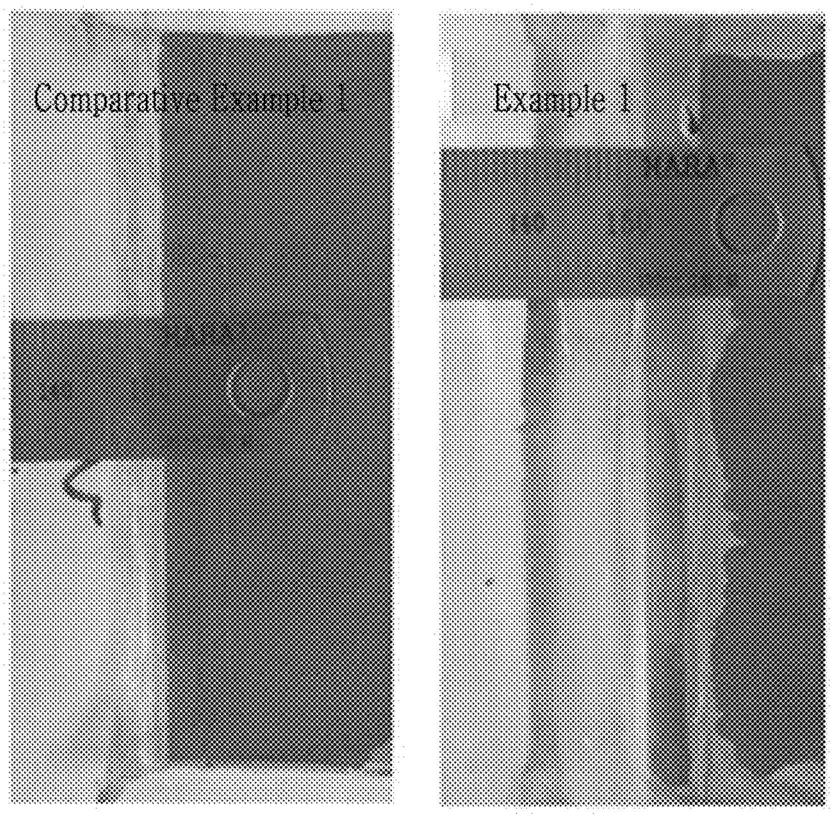
FIG. 8 is a sample photograph showing whether separators shrink after hot box evaluation of lithium secondary battery cells according to Example 1 and Comparative Example 1.

Referring to FIG. 8, Comparative Example 1 was 60% shrunk to the electrode plate and thus showed high possibility of a short circuit (the separator is colored as yellow; the electrode is marked as gray), but Example 1 was suppressed from separator shrinkage and thus exhibited the resulting minimized micro short circuit area.

Evaluation Example 5: Evaluation of Heat Shrinkage Rate

The separators for a lithium secondary battery according to Examples 1 to 4 and Comparative Examples 1 to 5 were cut into a size of 10 cm×10 cm to prepare samples, and after drawing a quadrangle with a size of 8 cm×8 cm on the surfaces of the samples, the samples were inserted between papers or alumina powers and left in an oven at 150° C. for 60 minutes. Thereafter, their shrinkage lengths in the machine direction/transverse direction were measured and used to calculating a heat shrinkage rate at 150° C., and the results are shown in Table 5.

Figure 9:
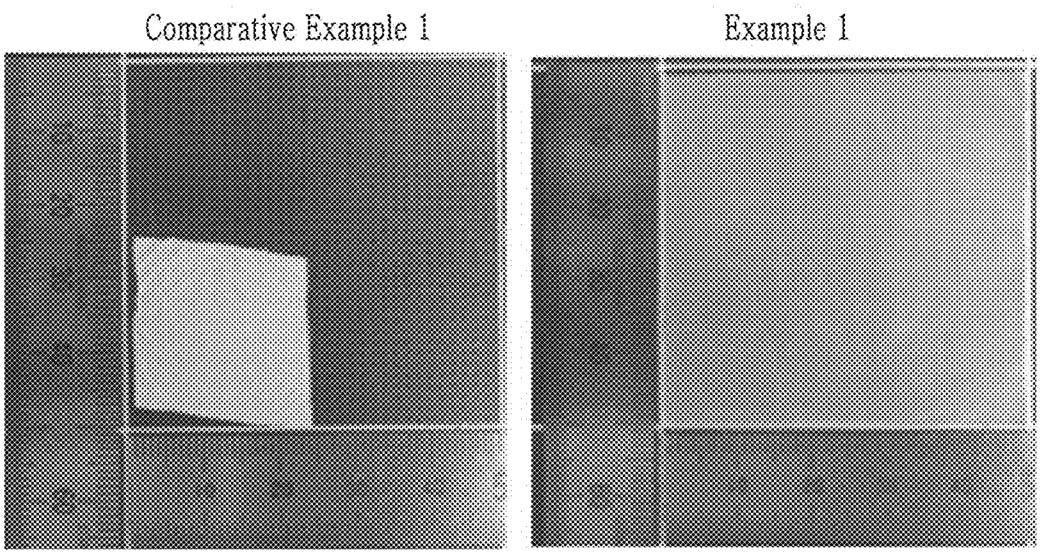
FIG. 9 is a sample photograph for comparing the results of evaluating shrinkage rates at 150° C. of lithium secondary battery cells according to Example 1 and Comparative Example 1.

FIG. 9 is a sample photograph for the comparing evaluation results of the 150° C. heat shrinkage rates in Comparative Example 1 and Example 1.

TABLE 5

| | Heat shrinkage rate (150° C., 60 min) MD (%)/TD (%) |
|---|---|
| Example 1 | 3/3 |
| Example 2 | 5/4 |
| Example 3 | 2/2 |
| Example 4 | 3/2 |
| Comparative Example 1 | 50/50 |
| Comparative Example 2 | 50/50 |
| Comparative Example 3 | 5/5 |
| Comparative Example 4 | 15/17 |
| Comparative Example 5 | 5/5 |

Referring to FIG. 9, the separator of Example 1 was not shrunk, but the separator of Comparative Example 1 was shrunk.

Specifically, referring to Table 5, the separators according to the examples exhibited a heat shrinkage rate of less than or equal to 5%, but the separators of the comparative examples exhibited a heat shrinkage rate of greater than or equal to 5% and up to 50%.

For example, the separator including inorganic particles having an average particle diameter of greater than 1.0 μm according to Comparative Example 2 exhibited a low coating layer packing density, a reduced contact area between particle and particle, compared with that of the particles, and a binding force decrease of the inorganic particles with a heat-resistant binder and thus sharply deteriorated heat resistance.

In summary, the separators according to the examples included a heat-resistant binder including a (meth)acrylic copolymer including a specific structural unit, inorganic particles, and an adhesive binder and thus exhibited a shrinkage rate of less than or equal to 5% at 150° C. and thus excellent heat resistance and adhesion characteristics as well as excellent adhesive strength to the substrate and/or heat resistance.

Evaluation Example 5: Evaluation of TMA (Thermo Mechanical Analyzer) Heat Shrinkage Rate of Coated Separator This evaluation was performed to examine shrinkage behaviors of the separators not in a free state but in a battery environment (winding, compression by an exterior material, etc.).

The shrinkage behaviors of the separators were evaluated by applying a load of 0.015 N to samples with a width of 5 mm in a TD direction and then, measuring size changes thereof by using a Q400 equipment (TA Instruments), while a temperature was increased at 5° C./min. The results are shown in Table 6 and FIG. 10.

TABLE 6

| | 150° C., TMA heat shrinkage rate TD (%) |
|---|---|
| Example 1 | 0 |
| Example 2 | 0 |
| Example 3 | 0 |
| Example 4 | 0 |
| Comparative Example 1 | 60 |
| Comparative Example 2 | 53 |
| Comparative Example 3 | 4 |
| Comparative Example 4 | 21 |
| Comparative Example 5 | 3 |

Figure 10:
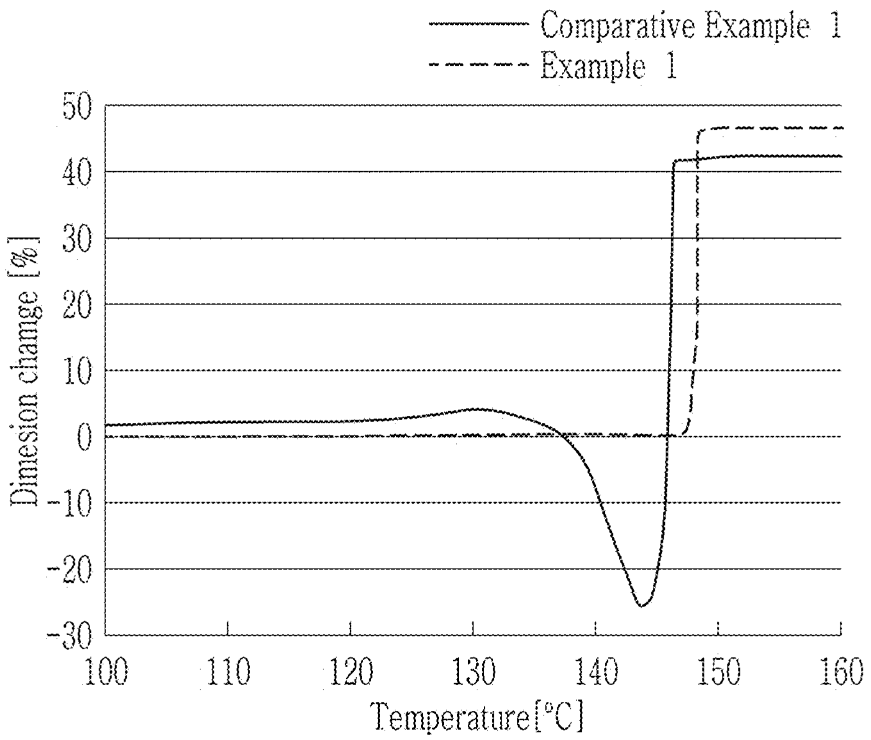
FIG. 10 is a graph showing the heat shrinkage rate characteristics using TMA (Thermomechanical Analyzer) of the separators according to Example 1 and Comparative Example 1.

Referring to FIG. 10, Comparative Example 1 exhibited a size change after 130° C. but a shrinkage of 27% at 144° C., but Example 1 exhibited no shape change up to 148° C. due to high heat resistance.

Specifically, referring to Table 6, the separators according to the examples exhibited a TMA heat shrinkage rate (TD) of 0% at 150° C., but the separators according to the comparative examples exhibited a TMA heat shrinkage rate (TD) of greater than or equal to 3% and up to 60%.

In summary, the separators according to the examples included a heat-resistant binder including a (meth)acrylic copolymer including a specific structural unit, inorganic particles, and an adhesive binder and thus exhibited excellent adhesive strength to the substrate and/or heat resistance and no shrinkage at 150° C. under TMA and thus realized excellent heat resistance and adhesion characteristics.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. A separator for a lithium secondary battery, comprising a porous substrate, and a coating layer comprising a heat-resistant layer on at least one surface of the porous substrate, an adhesive layer on the heat-resistant layer, inorganic particles, and an organic filler, the heat-resistant layer comprising a heat-resistant binder comprising a (meth)acrylic copolymer comprising a first structural unit derived from (meth)acrylamide, a second structural unit derived from (meth)acrylonitrile, and a third structural unit derived from (meth)acrylamidosulfonic acid, a (meth)acrylamidosulfonate salt, or a combination thereof, the adhesive layer comprising an adhesive binder having a core-shell structure and an average particle diameter of 0.2 μm to 1.0 μm, the inorganic particles excluding silica ($SiO_2$) and having an average particle diameter of 0.3 μm to 1.0 μm, and a ratio of a volume of inorganic particles to a sum of a volume of the adhesive binder and a volume of the organic filler is 33:1 to 1:1.

2. The separator of claim 1, wherein the adhesive binder is a (meth)acrylic polymer including a structural unit derived from (meth)acrylic acid or (meth)acrylate and a structural unit derived from a monomer having a polymerizable unsaturated group.

3. The separator of claim 2, wherein the monomer having the polymerizable unsaturated group is at least one selected from a styrene-based monomer, an acid-derived monomer, and a combination thereof.

4. The separator of claim 3, wherein the acid-derived monomer is at least one selected from itaconic acid, acrylic acid, and a combination thereof.

5. The separator of claim 1, wherein the adhesive binder is included in an amount of 1 to 20 wt % based on the total amount of the coating layer.

6. The separator of claim 1, wherein a weight ratio of the heat-resistant binder including the (meth)acrylic copolymer: the inorganic particles is 1:20 to 1:40.

7. The separator of claim 1, wherein the heat-resistant layer has a thickness of 1 μm to 5 μm, and the adhesive layer has a thickness of 0.4 μm to 1.4 μm.

8. The separator of claim 1, wherein the organic filler is included in at least one of the heat-resistant layer and the adhesive layer.

9. The separator of claim 8, wherein the organic filler has an average particle diameter of 120 nm to 500 nm.

10. The separator of claim 1, wherein the first structural unit derived from (meth)acrylamide is represented by Chemical Formula 1, the second structural unit derived from the (meth)acrylonitrile is represented by Chemical Formula 2, and the third structural unit derived from the (meth)acrylamidosulfonic acid, (meth)acrylamidosulfonate salt, or combination thereof is represented by one of Chemical Formula 3, Chemical Formula 4, Chemical Formula 5, or a combination thereof:

[Chemical Formula 1]

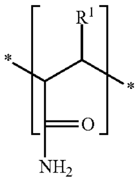

[Chemical Formula 2]

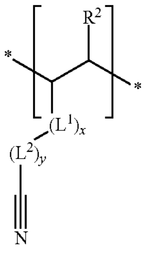

[Chemical Formula 3]

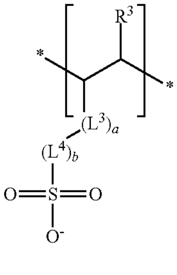

-continued

[Chemical Formula 4]

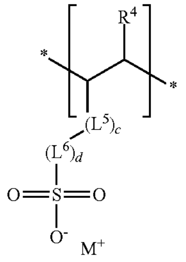

[Chemical Formula 5]

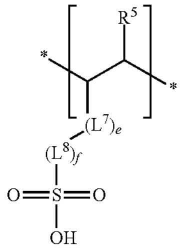

wherein, in Chemical Formula 1 to Chemical Formula 5, $R^1$ is hydrogen or a methyl group, $R^2$, $R^3$, $R^4$, and $R^5$ are each independently hydrogen or a C1 to C3 alkyl group, $L^1$, $L^3$, $L^5$, and $L^7$ are each independently —C(═O)—, —C(═O)O—, —OC(═O)—, —O—, or —C(═O)NH—, $L^2$, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, x and y are each independently an integer of 0 to 2, a, b, c, d, e, and f are each independently an integer of 0 to 2, and $M^+$ is an alkali metal.

11. A lithium secondary battery, comprising a positive electrode, a negative electrode, and the separator for the lithium secondary battery of claim 1 between the positive electrode and the negative electrode.

12. The separator of claim 1, wherein the core-shell structure comprises a shell that is a continuous layer comprising polymer particles, the polymer particles being overlapped in a radial direction of the polymer particles or in a form of a single layer.

13. The separator of claim 12, wherein the polymer particles are overlapped in the radial direction of the polymer particles.

14. The separator of claim 12, wherein the polymer particles are in the form of the single layer.

15. The separator of claim 1, wherein the heat-resistant layer further comprises the inorganic particles.

16. The separator of claim 1, wherein the first structural unit derived from (meth)acrylamide is included in an amount of 85 mol % to 99 mol % based on 100 mol % of the (meth)acrylic copolymer, the second structural unit derived from the (meth)acrylonitrile is included in an amount of 0.5 mol % to 10 mol % based on 100 mol % of the (meth)acrylic copolymer, and the third structural unit derived from the (meth)acrylamidosulfonic acid, (meth)acrylamidosulfonate salt, or combination thereof is included in an amount of 0.5 to 5 mol % based on 100 mol % of the (meth)acrylic copolymer.

17. The separator of claim 1, wherein the inorganic particles have an average particle diameter of 0.3 μm to 0.7 μm.

18. The separator of claim 1, wherein the ratio is 5:1 to 1:1.

19. The separator of claim 1, wherein the inorganic particles consist of $Al_2O_3$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

20. The separator of claim 1, wherein the organic filler is at least one selected from among (meth)acrylates, polyimides, diallyl phthalates, derivatives thereof, copolymers thereof, and combinations thereof.

* * * * *